(12) United States Patent
Giraudo

(10) Patent No.: US 11,823,166 B2
(45) Date of Patent: Nov. 21, 2023

(54) SYSTEM AND METHOD FOR LOCATION-BASED TRANSACTIONS

(71) Applicant: Key 2 Mobile LLC, San Diego, CA (US)

(72) Inventor: Anthony Giraudo, Albuquerque, NM (US)

( * ) Notice: Subject to any disclaimer, the term of this patent is extended or adjusted under 35 U.S.C. 154(b) by 0 days.

(21) Appl. No.: 16/813,690

(22) Filed: Mar. 9, 2020

(65) Prior Publication Data
US 2021/0065471 A1 Mar. 4, 2021

Related U.S. Application Data

(63) Continuation of application No. 16/522,504, filed on Jul. 25, 2019, now Pat. No. 10,650,622, which is a
(Continued)

(51) Int. Cl.
*G06Q 20/32* (2012.01)
*G06Q 30/0601* (2023.01)
(Continued)

(52) U.S. Cl.
CPC ............ *G06Q 20/3224* (2013.01); *G01S 5/10* (2013.01); *G01S 19/13* (2013.01); *G06Q 10/00* (2013.01); *G06Q 10/083* (2013.01); *G06Q 10/0832* (2013.01); *G06Q 10/0833* (2013.01); *G06Q 10/20* (2013.01); *G06Q 20/1085* (2013.01); *G06Q 20/12* (2013.01); *G06Q 20/209* (2013.01); *G06Q 20/325* (2013.01); *G06Q 20/326* (2020.05); *G06Q 20/4012* (2013.01); *G06Q 20/40145* (2013.01); *G06Q 20/42* (2013.01); *G06Q 30/0623* (2013.01); *G06Q 30/0631* (2013.01); *G06Q 30/0633* (2013.01); *G06Q 30/0639* (2013.01); *G07C 5/008* (2013.01); *G07C 5/085* (2013.01); *G07C 5/0816* (2013.01); *H04B 5/0031* (2013.01); *H04L 12/28* (2013.01); *H04L 12/2854* (2013.01);
(Continued)

(58) Field of Classification Search
None
See application file for complete search history.

(56) References Cited

U.S. PATENT DOCUMENTS

| 2012/0226556 A1* | 9/2012 | Itagaki | B62B 3/1416 705/14.64 |
| 2016/0314452 A1* | 10/2016 | Pochic | G06Q 20/322 |

(Continued)

*Primary Examiner* — Todd Melton
(74) *Attorney, Agent, or Firm* — Fitzsimmons IP Law

(57) ABSTRACT

A system and method for using at least location information to facilitate a transaction is provided. In one embodiment of the present invention, a mobile application operating on a mobile device is used to determine a location of the mobile device. Location information is then provided to a host device, where it is used to identify a merchant. Information is also entered (or acquired) to identify a shopping cart that is used during a shopping session. As items are placed within the cart, information concerning the items is presented to the user via a display on the cart and/or the mobile device. The first party can then interact with the same to enhance their shopping experience (e.g., access coupons, search for items, etc.). Once the user is done, the host device will charge a payment method linked to the user's account for items that are in the shopping cart.

20 Claims, 26 Drawing Sheets

Related U.S. Application Data continuation of application No. 16/207,615, filed on Dec. 3, 2018, now abandoned, which is a continuation-in-part of application No. 15/876,183, filed on Jan. 21, 2018, now abandoned, which is a continuation of application No. 15/620,110, filed on Jun. 12, 2017, now abandoned, which is a continuation of application No. 15/410,544, filed on Jan. 19, 2017, now abandoned.

(51) Int. Cl.
| | |
|---|---|
| *G06Q 20/40* | (2012.01) |
| *G06Q 20/12* | (2012.01) |
| *G01S 5/10* | (2006.01) |
| *H04B 5/00* | (2006.01) |
| *H04L 12/28* | (2006.01) |
| *G01S 19/13* | (2010.01) |
| *H04W 4/46* | (2018.01) |
| *H04W 4/48* | (2018.01) |
| *H04W 4/029* | (2018.01) |
| *G06Q 10/00* | (2023.01) |
| *G06Q 10/083* | (2023.01) |
| *G06Q 10/0832* | (2023.01) |
| *G06Q 10/0833* | (2023.01) |
| *G06Q 10/20* | (2023.01) |
| *G06Q 20/20* | (2012.01) |
| *G06Q 20/42* | (2012.01) |
| *G07C 5/00* | (2006.01) |
| *G07C 5/08* | (2006.01) |
| *H04L 67/306* | (2022.01) |
| *H04W 4/02* | (2018.01) |
| *H04L 67/52* | (2022.01) |
| *G06Q 20/10* | (2012.01) |
| *G01S 19/42* | (2010.01) |

(52) U.S. Cl.
CPC ............ *H04L 67/306* (2013.01); *H04L 67/52* (2022.05); *H04W 4/02* (2013.01); *H04W 4/027* (2013.01); *H04W 4/029* (2018.02); *H04W 4/46* (2018.02); *H04W 4/48* (2018.02); *G01S 19/42* (2013.01)

(56) References Cited

U.S. PATENT DOCUMENTS

2017/0186072 A1* 6/2017 Clark ................. G06Q 30/0633
2017/0200152 A1* 7/2017 Winkler .............. G06Q 20/321

* cited by examiner

| User 1 (2802a) | Recent Purchases (2804a) | Coupons (2806a) |
|---|---|---|
| ... | ... | ... |
| User n (2802b) | Recent Purchases (2804b) | Coupons (2806b) |

| Item 1 (2902a) | Brand (2904a) | Type (2906a) | Size (2908a) | Quantity (2910a) | Price (2912a) | Comments (2914a) |
|---|---|---|---|---|---|---|
| ... | ... | ... | ... | ... | ... | ... |
| Item n (2902b) | Brand (2904b) | Type (2906b) | Size (2908b) | Quantity (2910b) | Price (2912b) | Comments (2914b) |

SYSTEM AND METHOD FOR LOCATION-BASED TRANSACTIONS

BACKGROUND OF THE INVENTION

1. Field of the Invention

The present invention relates to use of location information, along with other data, to carry out a transaction, and more particularly to an application operating on a mobile device (e.g., smartwatch, smartphone, etc.), the application being configured to acquire a location of the mobile device and to use the acquired location, along with other data (e.g., user name, password, biometric data, time, etc.), to identify a store and a shopping cart at the store, both the shopping cart and the mobile device being used by the user to perform a transaction (e.g., shop for an item, purchase an item, etc.).

2. Description of Related Art

Mobile devices, such as smartphones and smartwatches, are becoming more and more a part of our everyday lives. For years, there has been talk of a "digital wallet," where a person's mobile device replaces their wallet, and can be used to pay for goods and services. Over the past several years, this talk has become a reality with services such as Apple Pay™. Apple Pay™ uses near field communication (NFC) technology to facilitate a transaction between a person's smartphone and a merchant's point-of-sale (POS) device. However, as shown in FIG. 1, in order for this transaction to take place, both the smartphone 300 and the POS device 400 must include NFC circuitry (e.g., 302, 402). NFC is a set of communication protocols that enable two electronic devices in close proximity (i.e., within four centimeters) to communicate with each other. The NFC standard is based on existing radio-frequency identification (RFID) standards and involves electromagnetic induction between two loop antennas.

While NFC technology can be used to facilitate a transaction, it has several drawbacks. First, NFC circuitry must be included in the mobile device, such as the smart phone or the smartwatch. Not only does such circuitry require a certain amount of real estate, but it adds costs to the mobile device; costs that are ultimately born by the consumer. Second, NFC circuitry must also be included in the POS device (e.g., the cash register). Again, not only does such circuitry require a certain amount of real estate, but it adds costs to the POS device; costs that are ultimately passed on to the consumer. And finally, the two devices must be in close proximity (less than four centimeters) in order to function properly.

In an effort to address some of these drawback, Samsung™ launched Samsung Pay™. While Samsung Pay™ supports NFC technology, it also supports Magnetic Secure Transmission (MST) technology. MST technology is technology that emits a magnetic signal that mimics the magnetic strip on a traditional payment card. As shown in FIG. 2, MST circuitry 302' in the smartphone 300' sends a magnetic signal to the card reader 402' of the POS device 400', emulating the swiping of a physical card. While MST technology has advantages over NFC technology (e.g., it can function with traditional POS devices, which include traditional card readers), it still requires MST circuitry 302' to be included in the smartphone 300', increasing the smartphone size and cost, and requires close proximity to the card reader in order to function properly. This is extremely problematic with portable electronic devices becoming smaller and smaller.

For example, smartwatches are becoming more and more popular, and more and more advanced. With a smartwatch, however, real estate is extremely limited, and there simply is not room for NFC and MST technology. And to the extent such technology could be added, it would be to the detriment of (e.g., in place of) other technology (e.g., technology that would allow the smartwatch to function autonomously, or without use of a smartphone). Furthermore, smartwatches also have a limited display, or are limited in the amount of information that can be provided to the user.

Thus, it would be advantageous to develop a mobile solution that overcame as least some of the foregoing drawbacks. For example, it would be beneficial if a small mobile device, such as a smartwatch, could facilitate a transaction without requiring any additional hardware and/or without having to be in close proximity to (or, in certain embodiments, even requiring) a POS device. It would also be advantageous to use a second, preferably larger, display on a second device (e.g., ATM, shopping cart, etc.) to display information to the user that may not be easily displayed on the mobile device or may more conveniently be displayed on the second device.

SUMMARY OF THE INVENTION

The present invention provides a system and method for using at least location information to facilitate a transaction. Preferred embodiments of the present invention include a host device in communication with at least a mobile device (e.g., smartphone, smartwatch, tablet, etc.) via a wide area network (WAN), such as the Internet.

In one embodiment of the present invention, the mobile device downloads a mobile application (e.g., from the host device, a third party, etc.). The mobile application can then be opened and/or logged into by a first party (e.g., a user of the mobile device). Information provided by the mobile application (e.g., user name, password, etc.) can then be used to identify an account, which is preferably linked to at least one payment method (e.g., user's credit card, user's debit card, user's PayPal™ account, user's host account, etc.). The application then provides the host device with other information, such as biometric data on the user, location information (e.g., the mobile device's location, information that can be used to determine the mobile device's location, etc.), time, etc., which can be used to authenticate the user (e.g., determine whether the user is authorized to use (or is associated with) the identified account) and identify a second party (e.g., a particular merchant). The latter may be accomplished using a second party/location map stored in a database on the host device, where location information provided to the host is used to identify (e.g., lookup) a second party in the database.

Once the second party is located, information concerning the first and/or second party can then be provided to the first party via the mobile device, an intermediate device (e.g., a device that allows the mobile device to communicate with the host device), and/or a separate, network-enabled device (e.g., a device owned and/or operated by the second party). Information on the second party, which may be previously provided by the merchant (e.g., a merchant device), stored in the database on the host device, and linked (directly or indirectly) to the location information, may include the identity of the second party (e.g., merchant's name, address, phone number, logo, store hours, etc.), and/or goods/services provided by the second party (e.g., a menu of goods/services provided by the merchant, a particular good/service purchased by the first party, etc.). Information on the first party may include the identity of the first party (e.g., name, email address, phone number, linked payment method, etc.) and/or goods/services selected (directly or indirectly) by the first party (e.g., directly via the mobile application, or indirectly via an employee or agent of the second party).

The host device may then continue to communicate with the mobile device, the merchant device, any intermediate device, a third-party financial device, and/or any separate, network-enabled device until the transaction is completed. This further communication may involve the display of options (or sub-options) to the first party (e.g., via the mobile device, an intermediate device, and/or a separate, network-enabled device), the selection of at least one option (or sub-option) by the first party, the providing of authenticating data (e.g., a PIN, etc.) by the first party, authenticating the authentication data (e.g., determining whether the provided PIN matches a previously provided PIN, determining whether a provided Card Security Code (CSC) matches the numbers on the back of a credit or debit card, etc.), which may be performed by the host device, the merchant device, and/or the financial device, determining whether the transaction is being made within an acceptable window of time (e.g., during business hours, during a time period allotted by the second party for the first party, etc.), transferring funds to complete the transaction (e.g., from the identified account to the merchant, etc.), and/or providing confirmation of the transaction (e.g., to the mobile device, the merchant device, the separate, network-enabled device, etc.), which may take place either before or after the actual funds have been transferred.

By way of example, a user may walk into (or up to) a store or kiosk and open and/or log into the mobile application. The host device may then use the login information to locate the user's account in the database, which may be linked to at least one payment method. The mobile application may then provide location information to the host device, where it is used to identify the store/kiosk. Information concerning the store/kiosk (e.g., name, logo, etc.) may then be provided to the mobile application and displayed to the user. This allows the user to confirm that the correct store has been located. The host device may then provide the user with a menu of goods/services offered at the store/kiosk. This can be done via the mobile device, an intermediate device, and/or a separate, network-enabled device (e.g., a device owned and/or operated by the second party). The user can then interact with the mobile device to select at least one good/service. After the selection has been made and/or acknowledged by the user, the host device may provide the transaction (or acknowledgement) to the merchant device, charge the user's payment method (if needed), and provide a receipt to the mobile application operating on the mobile device and/or the merchant device, which may include a separate, network-enabled device (e.g., Point-of-Sale (POS), Automated Payment System (APS), Automated Teller Machine (ATM), Set Top Box (STB), gaming device, etc.).

If the transaction is a purchase, the user can use the receipt to acquire the good/service from the store/kiosk and/or show proof of purchase before leaving the store/kiosk. As mentioned above, such a method may require a determination of whether the transaction is being performed during an acceptable window of time (e.g., during business hours, etc.). It may also require the user (including the mobile device) to be at a particular location in order for the transaction to be processed. In other words, location information can be used to both identify a particular merchant (e.g., allowing the host to provide the user with information on the merchant, such as store name, hours of operation, available goods/services provided by the merchant, etc.) and to authenticate the user (e.g., requiring the user to be inside or adjacent the merchant's store/kiosk before the user can purchase goods/services from the merchant, etc.).

In another example, the host device may receive an order from the merchant device (e.g., an order that the user placed with a cashier while in the store, etc.). The location information provided by the mobile application is then used to not only identify the store/kiosk but a pending order. In this example, the pending order is provided to the mobile application. If the user acknowledges the order, then the user's payment method is charged, and receipts are provided to the mobile application operating on the mobile device and the merchant device. The receipt would inform the merchant that the user has paid for the pending order. In this embodiment, it may not be necessary to determine whether the transaction is being performed during an acceptable window of time, as the second party's employee or agent (e.g., cashier, etc.) is involved in the transaction, ensuring that the transaction is taking place during an appropriate time (e.g., during business hours, etc.). As before, the location information can also function to authenticate the user, requiring the user to be at a particular location in order for the transaction to be processed. Such a feature would ensure that the mobile device is not being used to process a transaction from a remote (or unauthorized) location.

In yet another example, if there is more than one order pending, the host device could either provide the mobile application with the pending orders, requiring the user to select the order that is theirs, or another method could be used to associate one of the pending orders to the mobile application (or user's account). For example, the merchant could enter a name (or other identifying information) that could be used to identify the proper account, the user could enter identifying information (e.g., order number, etc.) that could be used to identify the proper order, or individual locations within the store could be used to identify individual orders. For example, a location in front of a first cashier could be used to link an account of a user standing at that location to an order placed by the first cashier, etc.

In embodiments of the present invention, the mobile device may include at least one transceiver configured to communicate with the host device via the Internet (e.g., either directly or indirectly, e.g., via an intermediate device) and to communicate with other devices in order to acquire location information and/or determine a user's location. For example, the transceiver(s) may be configured to communicate with the host device (either directly or indirectly) via at least one satellite, at least one cell tower, and/or at least one wireless (Internet) device (e.g., using Bluetooth, WiFi, etc.). The transceiver(s) may also be configured to communicate with these devices to acquire location information (e.g., using GPS, GSM (e.g., multilateration of radio signals between cell towers), WiFi-based positioning, etc.). In an alternate embodiment of the present invention, location information is provided by at least one radio head in a distributed system, as described in the co-pending patent application (Ser. No. 15/154,970), which is incorporated herein by reference.

A critical aspect of the invention is determining the location of the user, or more particularly the user's mobile device. As discussed above, this may be the actual location of the device, a more general location of the device, or a location of an intermediate device. This information can be used to authenticate the user and/or to identify at least one other party (e.g., a merchant). In one embodiment of the present invention, with respect to the latter, the system only needs to identify one from a plurality of parties (e.g., a plurality of stores, etc.). For example, if the device is located in (or in front of) a first store/kiosk, then acts of commerce associated with the first store/kiosk can be provided to the user. Similarly, if the device is located in (or in front of) a second store/kiosk, then acts of commerce associated with the second store/kiosk can be provided to that user.

In another embodiment of the present invention, location of the device is used to determine more than just the store in which the device is located. In this embodiment it is further used to identify where inside the store the device is located. For example, the device could be in front of a first checkout, a second checkout, etc. This embodiment allows multiple pending orders to be linked to the proper user, or mobile application. For example, if the user is standing in front of the first cashier, and the first cashier has just entered an order, then the order can be associated with the user regardless of other orders entered by other cashiers, or other applications operating on other mobile devices within the store.

As discussed above, location information can also be used to authenticate the user. For example, if the user is attempting to perform an ATM transaction, the present invention can use location information to ensure that the user (including the mobile device) is located near (or in front of) the ATM. Similarly, if the user is attempting to perform a store transaction, the present invention can use location information to ensure that the user is located within (or in close proximity to) the store. Not only would this prevent a user from performing a transaction from remote (or unauthorized) locations, but it would allow other security measures, such as security cameras at the authorized location(s), to discourage fraudulent usage.

As discussed above, a second party/location map may be used (along with location information of the mobile device) to identify a particular second party. In one embodiment, this data is also used to authenticate the user. In other embodiments, other data is further (or alternatively) used to authenticate the user. For example, a particular location (e.g., X-Y coordinates) along with a first proximity (e.g., within a one-hundred-foot radius of the particular location) may be used to identify a second party. In one embodiment, this same data is used to identify authorized locations, or authenticate the user. In other embodiments, other data, perhaps more stringent data (e.g., within a 10-foot radius of the particular location, within a 10-foot radius from a different location, etc.), is used to identify authorized locations, or authenticate the user. As such, the second party/location map may include several fields, including information on the second party (e.g., name, address, phone number, hours of operation, goods/services provided, etc.), information that can be used to identify the second party (e.g., at least one location, a first proximity value, etc.), and/or information that can be used to identify authorized locations (e.g., at least one location, a second proximity value, etc.).

The user's account may also be linked to at least one authorized location (e.g., at least one location, proximity data, etc.). This could be used, for example, to authenticate the user if the user is attempting to carry out a transaction from a remote location (e.g., from the user's home, etc.). This could also be used in delivering an item to an authorized location. For example, a delivery person (e.g., UPS, FedEx, Amazon Prime, etc.) may use the mobile device (or an application operating thereon) to provide location information (i.e., a location of the mobile device) to the host device. If it is determined that the delivery person is at or near the authorized location, then the host device provides instruction to a network-enabled device (e.g., operated by the first party, etc.), instructing the device to unlock or provide access to a particular building or a particular secured enclosure. Once the item is placed inside, the building or enclosure can again be secured (e.g., locked).

In certain embodiments of the present invention, the mobile device is a smartphone. However, in other embodiments, the mobile device may be a wearable device, such as a smartwatch. In such embodiments, because the amount of information that can be displayed is limited (e.g., due to the size of the wearable device), the mobile application and/or host device may be configured to display data to the first party using a plurality of display devices, or display means. For example, in one embodiment of the present invention, the wearable device may be configured to display first content on the mobile device and second content elsewhere. For example, the second content could be projected by the mobile device (e.g., using a projection device). By way of another example, the second content could be displayed using a separate, network-enabled device. For example, if a wearable device (e.g., a smartwatch) is in communication with the host device via an intermediate device (e.g., a smartphone), then second content may be displayed on the intermediate device (or a display portion thereof).

In another example, second content may be displayed on a network-enabled device owned and/or operated by the second party (or a display portion thereof). By way of example, a first party standing in front of an ATM may open and log into the mobile application. Using the location of the wearable device, the mobile application (or host device) may identify the ATM, and ask the first party (via the wearable device) to confirm whether they would like to use the application to facilitate a transaction with the ATM. If the first party answers in the affirmative, the host device may then ask the first party (e.g., via the ATM display) to enter their PIN. The first party may then enter their PIN on the wearable device. If the provided PIN matches a predefined PIN, then the host device may provide the first party with a plurality of options, such as withdraw money, make a transfer, etc. The options can either be provide on the wearable device or provided on the ATM. However, if the options are provided on the ATM, the options should correspond to entries on the wearable device (e.g., press "1" for withdraw, "2" for transfer, etc.). By selecting the appropriate option, which may result in further sub-options (e.g., enter the amount to withdraw, etc.), the mobile application, along with the ATM, can be used to facilitate a financial transaction.

The same technology could be used to interact with other network-enabled devices. For example, if the first party is seated in front of a gaming device (e.g., slot machine, video poker, keno, lottery, etc.), the mobile application could be used to add money to the gaming device, retrieve money from the gaming device, and/or play the gaming device. If a financial transaction is requested, then the sequence of steps may be similar those use with the ATM. If, however, the wearable device is used to play the game, the gaming device may be used to display options, and the wearable device may be used to select from corresponding entries (e.g., press "1" for slots, "2" for video poker, etc.). By way of another example, if the first party is in a hotel room or on an airplane, the mobile application could be used to interact with a television or a related STB to select a movie to be played (e.g., the TV/STB could be configured to display a plurality of movie options, and the wearable device could be configured to provide the user with a plurality of corresponding entries (e.g., press "1" for the first movie, "2" for the second movie, etc.)).

While wearable devices may have drawback (e.g., screen size, etc.), they also include certain advantages. For example, because the wearable device is being worn by the first party, it could be used to capture biometric data of the first party. For example, a camera feature on the device could be used along with facial and/or retina recognition software to identify/verify the first party, a microphone feature on the device could be used along with voice recognition software to identify/verify the first party, and/or a sensor feature on the device (e.g., capturing heart rate data, etc.) could be used to confirm that the wearable device is being worn while the mobile application is being used to facilitate a transaction. By way of another example, the mobile application may use the sensor data (e.g., EKG, etc.), either alone or together with other data, to uniquely identify the first party. By being able to confirm that the user has possession of the mobile device, is at a location of the transaction, knows the correct password, and exhibits correct (or matching) biometric data, the mobile application, along with the host device, can be used to carry out sensitive transactions, such as banking or other financial transactions. If the mobile device includes a camera, the camera could further be used to capture a photo of the user while the transaction is being carried out. The photo could then be provided to the host and stored together with transaction information. Such use of the mobile device (e.g., as a security camera) should further detour fraudulent usage of the present invention.

The present invention may also be used in conjunction with a shopping cart or basket to enhance a first party's shopping experience. For example, a host device may be in communication with a plurality of devices either directly or indirectly, including a mobile device operated by a first party, a merchant device operated by a second party, and a shopping cart, which may or may not be operated by the second party. The shopping cart (or basket) may include intelligence, such as a processor, memory, transceiver(s), scanner, display, and input device, where the scanner (either alone or together with other technology) is configured to identify items that have been placed into the cart (or basket), and the display and input device are configured, respectively, to provide information to the first party and to receive information from the first party.

In one embodiment of the present invention, each cart (or basket) has its own unique identifier (ID), allowing the system to identify a specific one (from a plurality) that is being used by the first party. This may be accomplished, for example, by entering a unique ID of the cart/basket into the mobile device (e.g., an ID printed on the cart/basket or provided on a display portion thereof). Once the devices (mobile device, merchant device, host device, shopping cart or basket) are linked, the first party can use the mobile device and/or the shopping cart (or the display and/or input device portions thereof) to participate in a shopping session.

For example, the first party may be presented (on the shopping cart and/or mobile device) with a plurality of options, including a map button, a search button, and a coupon button. If the map button is selected, a map of the store may be presented on the shopping cart display. If the search button is selected, the first party may be presented with a field for entering at least one search term (e.g., "mashed potatoes"). Search results, which may include a map showing where the item is located, may be provided on the shopping cart display. The shopping cart display can also be used to provide the first party with coupons (generic or personalized), information concerning prior purchases (e.g., information stored by the merchant and/or host devices from prior sessions), or information concerning a shopping list (e.g., information uploaded by the first party).

A more complete understanding of a system and method for using at least location information to facilitate a transaction will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIGS. 28 and 29 depict exemplary databases for mapping users to user information, such as recent purchases, coupons (personalized and/or generalized), shopping lists, etc.;

DETAILED DESCRIPTION OF THE PREFERRED EMBODIMENT

Preferred embodiments of the present invention include a host device communicating with at least a mobile device (e.g., smartphone, smartwatch, tablet, etc.) via a wide area network (WAN), such as the Internet. It should be appreciated that while the present invention is described in terms of facilitating a financial transaction (e.g., paying money in exchange for goods and/or services), the present invention is not so limited, and can be used to carry out any type of transaction (e.g., acquire money from an Automatic Teller Machine (ATM), pay for parking at an Automated Pay Station (APS), retrieve a vehicle from a parking structure/lot (e.g., valet, car rental, etc.), play a movie/game on a television (e.g., in a hotel room, etc.) (e.g., using a Set Top Box (STB)), add funds to (or acquire funds from) a gaming machine (e.g., slot machine, video poker, provide money to a friend or family member, etc.), paying for items present in a shopping cart, providing access for at-home delivery, etc.).

Figure 1:
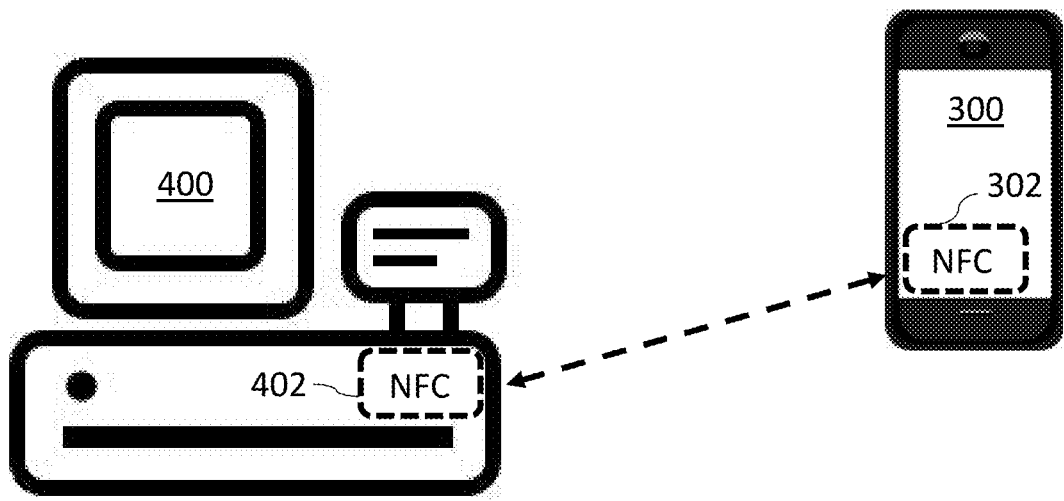
FIG. 1 depicts a prior art mobile device communicating with a POS device using Near Field Communication (NFC) technology.
Figure 2:
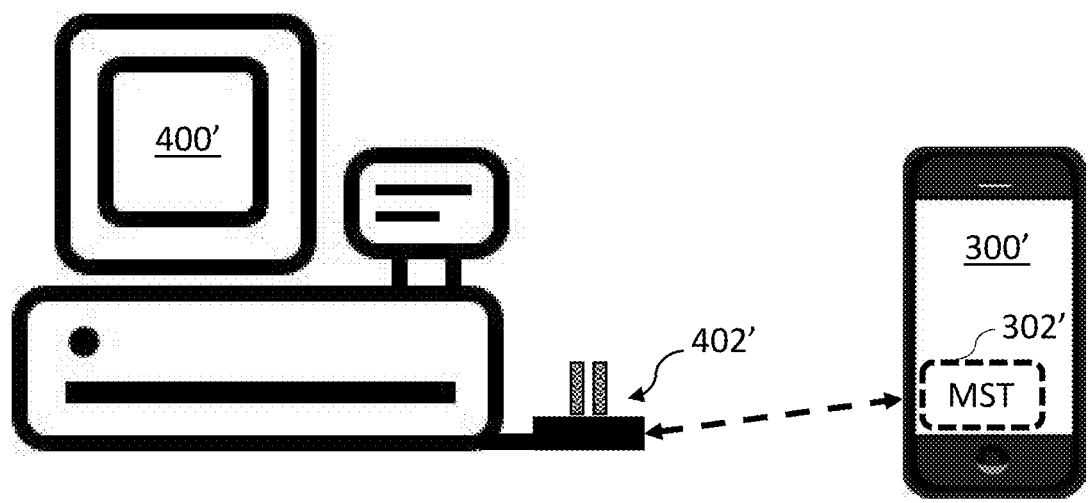
FIG. 2 depicts a prior art mobile device communicating with a POS device using Magnetic Secure Transmission (MST) technology.

FIGS. 1 and 2 depict prior art mobile devices that can be used to facilitate financial transactions, with FIG. 1 using Near Field Communication (NFC) technology and FIG. 2 using Magnetic Secure Transmission (MST) technology. While both of these technologies can be used facilitate a financial transaction, they both have common drawbacks. For example, both technologies require additional circuitry (and additional costs) and close proximity in order to facilitate a transaction.

Figure 3:
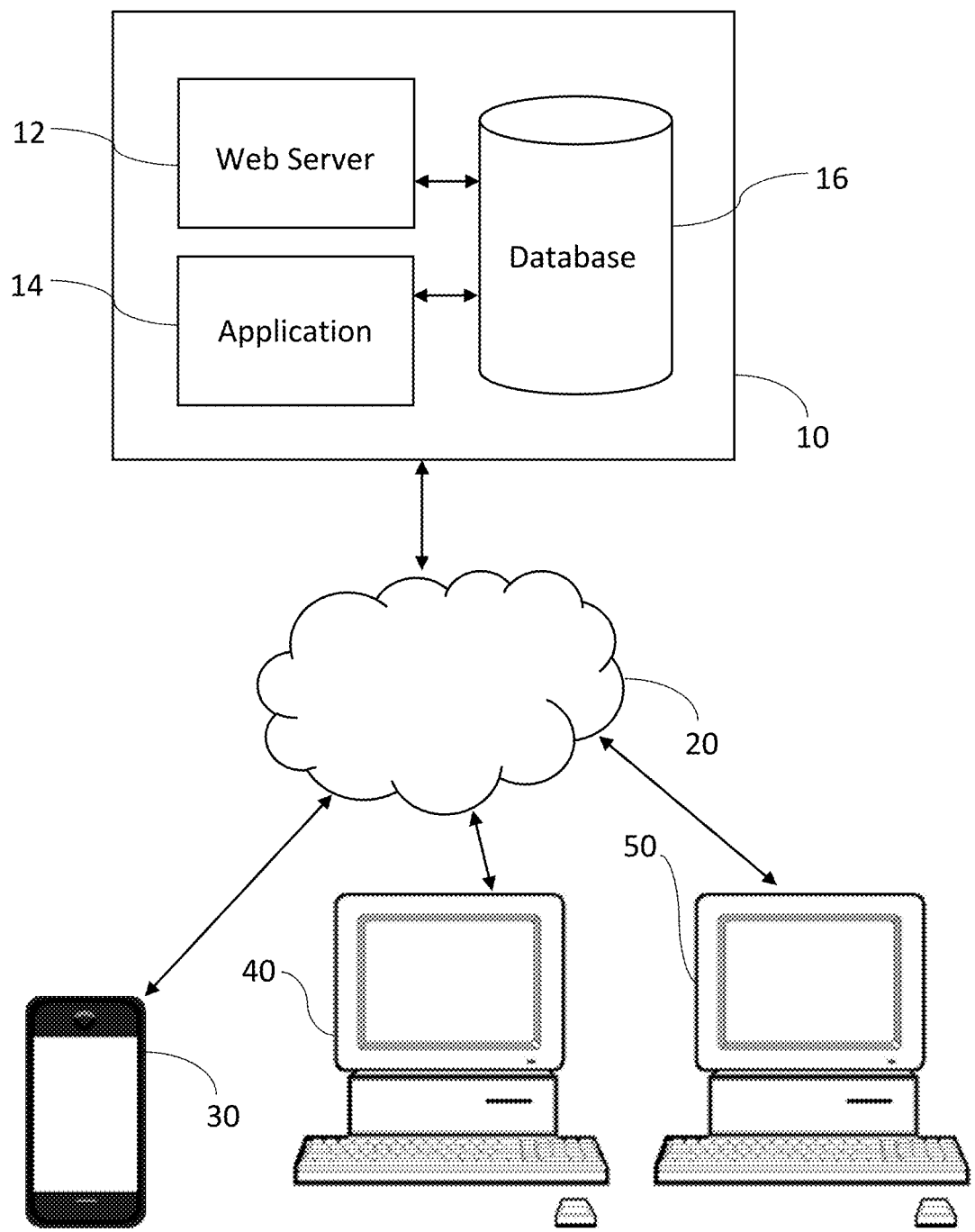
FIG. 3 depicts a system that uses at least location information to facilitate a transaction in accordance with one embodiment of the present invention, said system comprising at least a host device in communication with a mobile device, a merchant device, and/or a third-party device (e.g., payment device)

The present invention addresses these drawbacks by using existing circuitry (along with custom software) to facilitate a transaction. In one embodiment of the present invention, as shown in FIG. 3, the mobile device 30 can be used to facilitate a transaction by using standard mobile device circuitry to communicate with a host device 10 over a wide area network (WAN) 20, such as the Internet. The host device may also be in communication with at least one merchant device 40, such as a POS device, and at least one third-party device 50, such as a device at a financial institution (e.g., a credit card company, PayPal™, a bank, etc.).

It should be appreciated that while FIG. 3 depicts the mobile device 30 as a smartphone, and the merchant device 40 and the third-party device 50 as desktop computers, the present invention is not so limited. For example, use of any networked device (e.g., desktop computer, laptop computer, tablet, smartphone, smartwatch, network-enabled appliance, network-enabled POS device, network-enabled monitor, network-enabled television, server, etc.), or combination thereof, by either party (customer, merchant, and/or financial institution), is within the spirit and scope of the present invention. It should also be appreciated that the present invention is not limited to a host device 10 that includes the components depicted in FIG. 3. For example, a host device that includes fewer, additional, and/or different components is within the spirit and scope of the present invention.

In one embodiment of the present invention, as shown in FIG. 3, the mobile device 30 downloads a mobile application (not shown) (e.g., from the host device, a third party, etc.). The mobile application, operating on the mobile device 30, can then be opened and/or logged into, where it will communicate with the host device 10 (e.g., via the web server 12 and the WAN 20). Information provided by the mobile application and stored in the database 16 (e.g., user name, password, etc.) can then be used to identify the first party's (user's) account, which is preferably linked to at least one payment method (e.g., user's credit cart, user's debit card, user's PayPal™ account, user's account on the host device, etc.). Other information, such as biometric data on the user, location information (e.g., the mobile device's location, information that can be used to determine the mobile device's location, etc.), time, etc., may be received from the mobile application and used (e.g., by the application 14) to authenticate the user (e.g., determine whether the user is authorized to use (or is associated with) the identified account, determine whether the user is at an authorized location, etc.) and identify a second party (e.g., a particular merchant). The latter may be accomplished using a second party/location map stored in the database 16 (discussed below).

Once the second party is located, information concerning the second party can then be provided to the mobile application operating on the mobile device 30 and displayed to the first party (user). The information, which is preferably provided by the merchant device 40, stored in the database 16, and linked (directly or indirectly) to the location information, may include the identity of the second party (e.g., merchant's name, address, phone number, logo, store hours, etc.), goods/services provided by the second party (e.g., a menu of goods/services provided by the merchant, a particular good/service purchased by the first party, etc.), goods/services requested by the first party (e.g., a request taken by an agent/employee of the second party, for example, while the first party is within a brick-and-mortar location of the second party, etc.), and/or accessories (e.g., an alternative (or secondary) display device (e.g., on a shopping cart, on a shopping basket, etc.), etc.) provided by the first party and/or used by the second party.

The host device 10 (or application 14 operating thereon) may then continue to communicate with both the mobile device 30 and/or the third-party device 50 until the financial transaction is complete, which may involve communications between the host device 20 and the third-party device 50 (e.g., to debit the first party's account with a third-party financial institution). Examples and details of how the invention may be used to facilitate a transaction will now be provided.

In one embodiment of the present invention, a user may walk into (or up to) a store or kiosk (e.g., which may include an ATM, APS, STB, etc.) and open and/or log into the mobile application. The host device 10 may then use the login information to locate the user's account in the database 16, which may be linked to at least one payment method. The mobile application may then provide location information to the host device 10, where it is used to identify the store or kiosk in the database 16. Information concerning the store or kiosk (e.g., name, logo, etc.) may then be provided to the mobile application and displayed to the user. This allows the user to confirm that the correct store or kiosk has been located.

In a first example, the application 14 may then provide the user with a menu of goods/services offered at the store or kiosk. The user can then interact with the menu to place an order for at least one good/service. After the order has been placed and/or acknowledged by the user, the application 14 may provide the order to the merchant device 40, charge the user's payment method (e.g., after the order has been acknowledgement by the merchant, etc.) via the third-party device 50, and provide a receipt to the mobile application operating on the mobile device 30 and/or merchant device 40. The user can then use the receipt to acquire the good/service from the store or kiosk and/or show proof of purchase before leaving the vicinity.

In a second example, the application 14 may receive an order from the merchant device 40 (e.g., an order that the user placed with a cashier while in the store, outside of a kiosk, by placing items within a shopping cart, etc.). The location information provided by the mobile application is then used to not only identify the store or kiosk but a pending order. The pending order would be provided to the mobile application. If the user acknowledges the order, then the user's payment method would be charged (e.g., via the third-party device 50), and receipts would be provided to the mobile application operating on the mobile device 30 and the merchant device 40. The receipt would inform the merchant that the user has paid for the pending order and can now provide the user with the corresponding good/service.

In the second example, if there is more than one order pending, the host device could either provide the mobile application with the pending orders, requiring the user to select the order that is theirs, or another method could be used to associate one of the pending orders to the user's account. For example, the merchant could enter a name (or other identifying information) that could be used to identify the proper account, the user could enter identifying information (e.g., order number, etc.) that could be used to identify the proper order, or individual locations within the store could be used to identify individual orders. For example, a location in front of a first cashier could be used to link an account of a user standing at that location to an order placed by the first cashier, a location in front of a second cashier could be used to link an account of a user standing at that location to an order placed by the second cashier, etc. In yet another example, a shopping cart (or identifying information thereof) could be used to link the user's account to an order for items that have been placed within the cart.

It should be appreciated that other information may be used in conjunction with location information to identify a particular merchant and/or pending order, or to determine whether the requested goods/services should be provided. For example, to identify a pending order, time or a time period (e.g., a fifteen second window, etc.) may be used along with location information. In other words, an order that was placed within fifteen seconds of a request to pay by the mobile application is more likely the correct order than an order that was placed five minutes ago. By way of another example, certain goods/services may only be available during a particular window of time. For example, a request to purchase a particular item from a store that is only open from 9:00 AM to 5:00 PM may only be accepted (or processed) if the request is received at an acceptable time (i.e., between 9-5). By way of another example, a first party (e.g., tenant, real estate agent, etc.) may only be able to unlock a network-enabled door (or a door having a network-enabled lock) (e.g., to a hotel room, a house for sale, etc.) owned, controlled, or operated by a second party (e.g., hotel manager, relator, etc.) during a particular window of time, where the window of time is allocated by the second party for the first party. This would allow, for example, a guest to have access to a hotel room on a day, a real estate agent to have access to a house for sale during a particular hour, etc. The same technology could be used to allow access to, or operate any rental, regardless of whether the rental is a structure (e.g., a hotel room, etc.), a device (e.g., a vehicle, etc.), or a service (e.g., a pay-per-view movie, etc.).

It should also be appreciated that location information may include information previously acquired (e.g., before the user enters the store). This would allow the present invention to operate when the mobile device is unable to acquire location information at the time a purchase is being made/confirmed. It should further be appreciated, as discussed above, that the present invention is not limited to facilitating financial transactions at a store. For example, the present invention could be used to acquire money from an ATM (e.g., while standing in front of the ATM, using the mobile device to request funds), order a movie in a hotel room (e.g., while sitting in the hotel room, using the mobile device to select the movie), add funds to (or acquire funds from) a gaming device, such as a slot or video poker machine (e.g., while seated in front of the gaming device, using the mobile device to facilitate the transaction), pay for a service at an APS (e.g., while standing (or parked) in front of the APS, using the mobile device to pay an amount owed), provide money to a friend or family member, pay for items present in a shopping cart, provide door or lock-box access for at-home or parcel delivery, etc.

Figure 4:
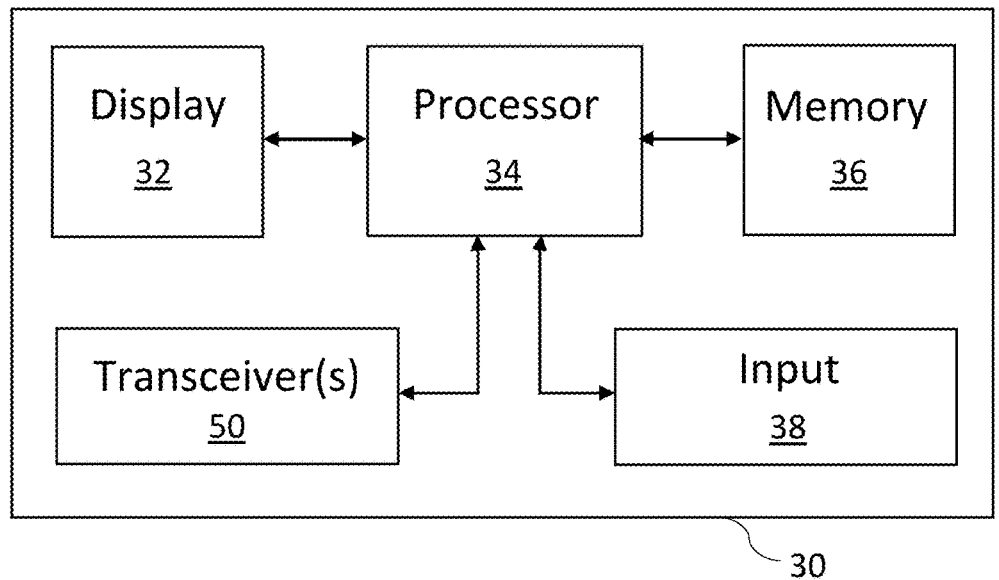
FIG. 4 depicts one embodiment of components included in the mobile device shown in FIG. 3.

FIG. 4 illustrates components that may be included in the mobile device, such as a display 32, processor 34, memory 36, input 38, and transceiver(s) 50. In one embodiment of the present invention, the memory 36 may be configured to store a mobile application (e.g., downloaded from the host device, a third party, etc.), data on the first party (e.g., their account and information linked thereto (e.g., user name, password, biometric data, payment method, etc.), data on the second party (e.g., their name, address, telephone number, transactions offered, pending transactions, etc.), data that can be used to identify a second party based on location information (e.g., at least one location, proximity data, etc.), and/or at least one authorized location (e.g., for the first party, the second party, etc.). The transceiver(s) may be configured to communicate with the host device via the WAN and to communicate with other devices in order to acquire location information and/or determine a user's location.

Figure 5:
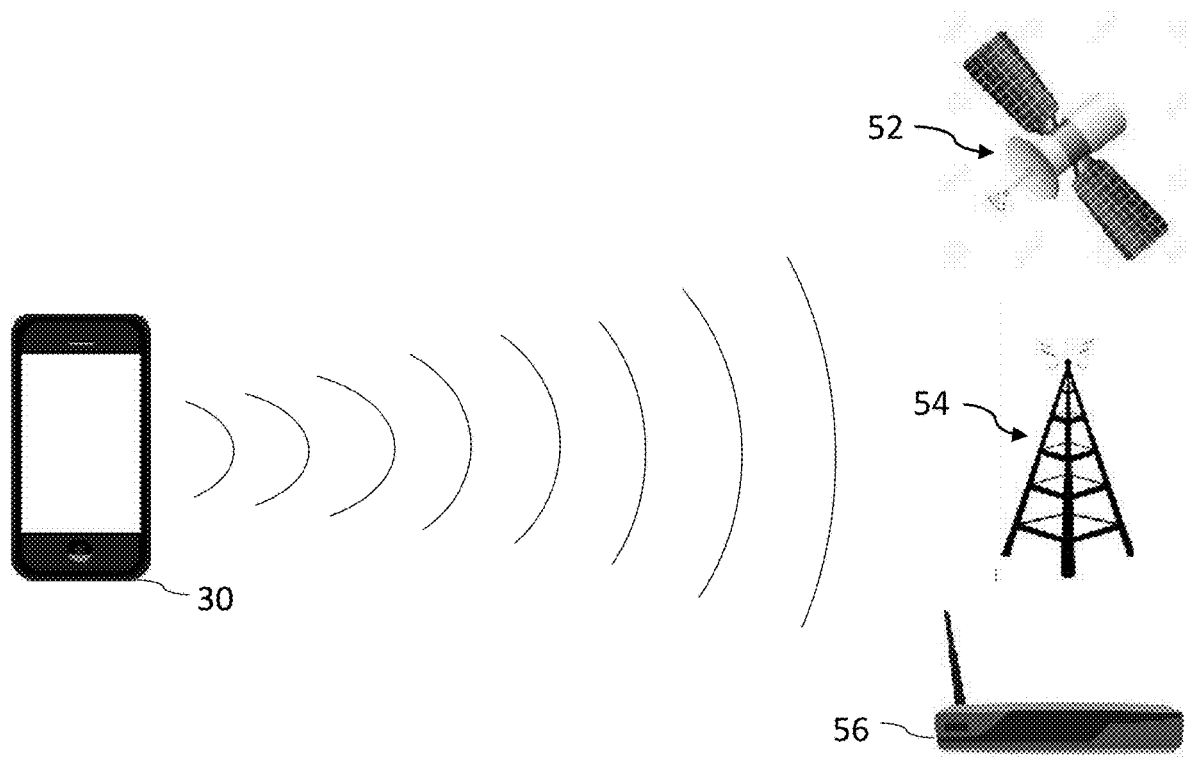
FIG. 5 depicts exemplary devices that the mobile device may communicate with in order to acquire location information.

For example, as shown in FIG. 5, the transceiver(s) 50 may be configured to communicate with the host device via at least one satellite 52, at least one cell tower 54, and/or at least one wireless (Internet) device (e.g., using Bluetooth, WiFi, etc.). The transceiver(s) 50 may also be configured to communicate with these devices to acquire location information (e.g., using GPS, GSM (e.g., multilateration of radio signals between cell towers), WiFi-based positioning, etc.). It should be appreciated that the term location information, as used herein, may be the actual location of the device (e.g., x, y, and/or z coordinates), an estimated or approximate location of the device, or information that can be used to acquire or estimate the location (or approximate location) of the device. It should also be appreciated that the present invention is not limited to any particular method for determining location, and all methods generally known to those skilled in the art are within the spirit and scope of the present invention.

For example, in one embodiment of the present invention, the mobile device may acquire location information from a network device, such as radio head. Such a system is disclosed in co-pending patent application entitled "Multi-Standard in Building Mobile Radio Access Network," filed on May 14, 2016 (Ser. No. 15/154,970), the contents of which are incorporated herein by reference. In particular, the disclosure of how a plurality of radio heads, located throughout a building can be used to provide location information on a mobile device is incorporated herein by reference.

Figure 6:
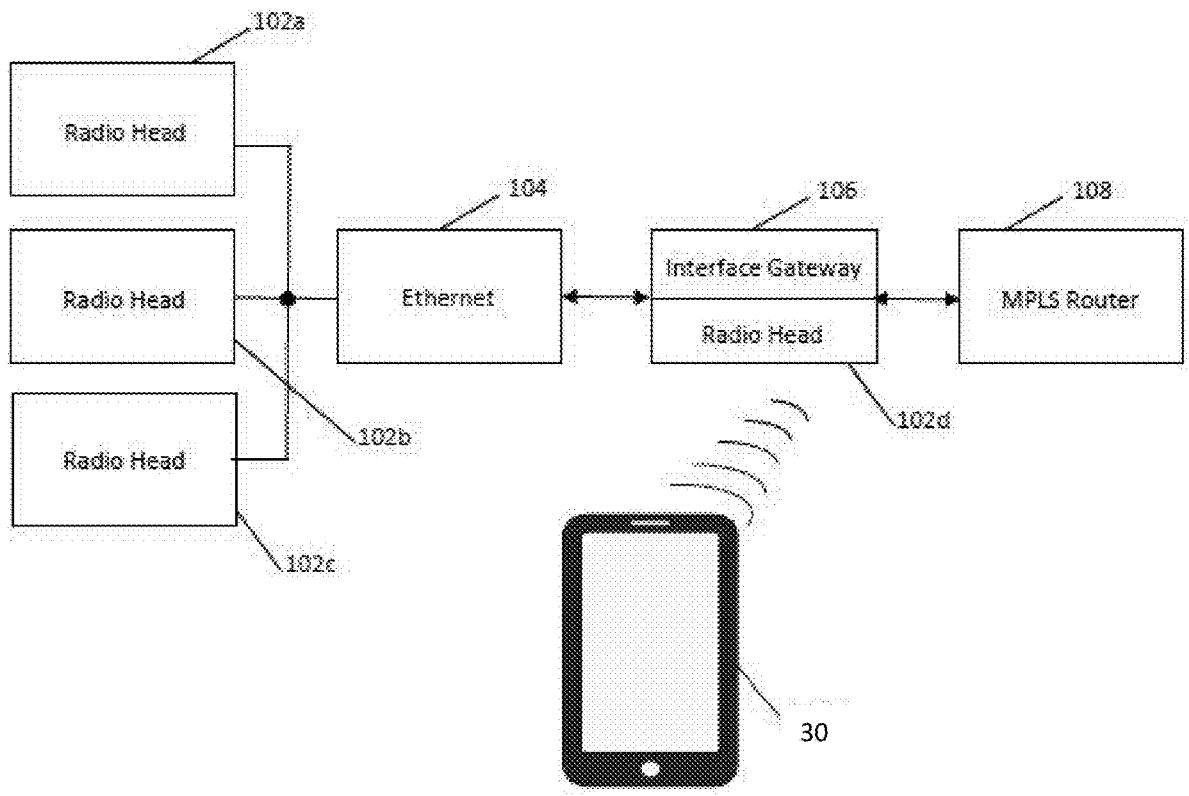
FIG. 6 depicts another device (i.e., radio head) that the mobile device may communicate with in order to acquire location information.

Such a system is shown in FIG. 6, where a distributed system is used to determine a location of a mobile device. Such a system includes at least one mobile device 30 and at least one centralized device (e.g., interface gateway 106 and/or radio head 102d) in communication with a plurality of radio heads (e.g., 102a, 102b, 102c). The centralized device may be configured to recognize when the mobile device 30 has entered a particular service area (e.g., entered a particular building). As the mobile device 30 moves around the service area (e.g., from floor to floor of the building), the mobile device may communicate with different radio heads (e.g., 102a, 102b, 102c). It is during this communication that the radio head can inform the mobile device 30 and/or the centralized device (e.g., interface gateway 106 and/or radio head 102d) of the mobile device's location (e.g., x, y, and/or z coordinates). The mobile device's location can then be provided to the host by the mobile device (as previously discussed), or by the centralized device (via a separate communicate with the host device or by intercepting and modifying the mobile device's communication with the host device).

Figure 7:
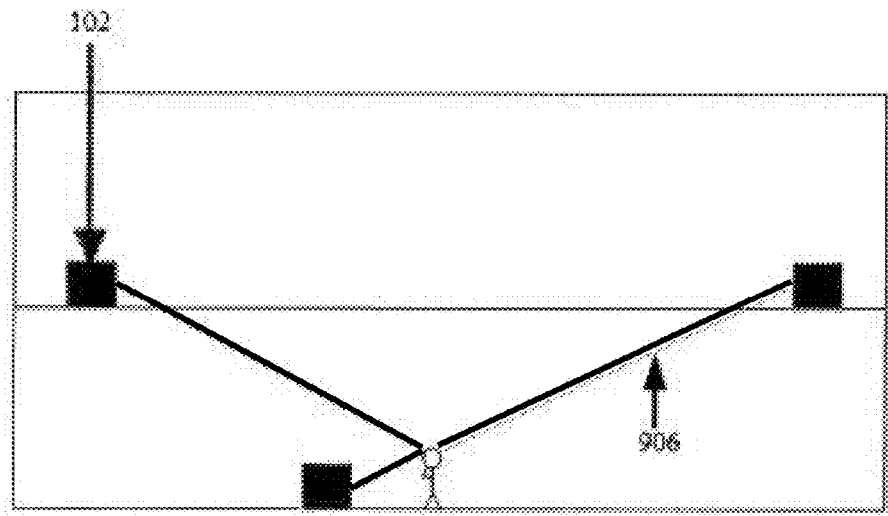
FIG. 7 illustrates how a plurality of radio heads can be used to identify the mobile device's location (e.g., x, y, and/or z).

As shown in FIG. 7, radio heads can use received power to determine the location of a mobile device. The received power level from a particular mobile device is measured by a plurality of radio heads 102. Since the absolute transmitted power by the mobile device is unknown, the relative received signal strength at the radio heads are compared and the location of the mobile device can be estimated based on the relative distances from the radio heads. In another embodiment, a time of arrival approach can be used (either alone or in addition a received power approach) to locate the position of the mobile device. In this layout, radio heads 102 will look for a special signal or signal feature and create a timestamp of the signal feature arrival. Using the travel time of signals traveling through air at approximately 1 ns/ft over a distance between the device and the radio head 906, the relative position of the mobile device is determined. With respect to each radio head, its position could be programmed during installation for maximum accuracy, but the techniques described above, namely based on power measurement and time-of-arrival measurement, can also be applied for the radio heads to determine their own relative positions. In yet another embodiment (described in further detail in the co-pending application), sensors can be used to monitor the transmission from the radio head(s) 102. This extra capability would allow the location measurements to remain accurate even if the radio heads are moved from the manually entered positions at installation.

It should be noted that the location information provided by the radio heads not only gives latitude and longitude coordinates for each mobile device, but also floor information, allowing a user to be even more precisely located by including information about their altitude. This information is particularly useful when facilitating a transaction in a multi-floor structure. As discussed above, the location information could be conveyed from the mobile device to the host, directly, or from the centralized device (e.g., interface gateway 106 and/or radio head 102d) to the host device. In other words, the centralized device (or a portion thereof) could be used to provide location information to the host device, similar to how 911 communications are described in the application incorporated by reference. This can be done by either a separate communication or by intercepting and modifying the mobile device's communication. Once the host has the location information, it can function as previously discussed (i.e., with the merchant and mobile devices).

With reference to FIG. 4, it should be appreciated that a mobile device operating in accordance with embodiments of the present invention may include additional, fewer, or different components. For example, a mobile device that further includes a dedicated GPS processor is within the spirit and scope of the present invention. Further, a mobile device that includes at least one input 38, such as a keyboard (providing hard keys), touchscreen (providing soft keys), camera, and/or microphone is also within the spirit and scope of the present invention. Finally, while the transceiver(s) 50 may be configured to communicate with a host device via at least one satellite 52, at least one cell tower 54, and/or at least one wireless (Internet) device 56, the communication path may not be so direct. For example, the mobile device may be configured to communicate with the host device via at least one other device (i.e., an intermediate device). By way of example, a smartwatch may be communicating with a smartphone via Bluetooth or WiFi, which in turn is communicating with the host via a separate communication link (see, e.g., FIG. 5). In such an embodiment, the mobile application (or host device in communication therewith) could use location information of either device to facilitate a transaction. This is due to the close proximity of the smartwatch (e.g., mobile device) and the smartphone (e.g., intermediate device).

Figure 8:
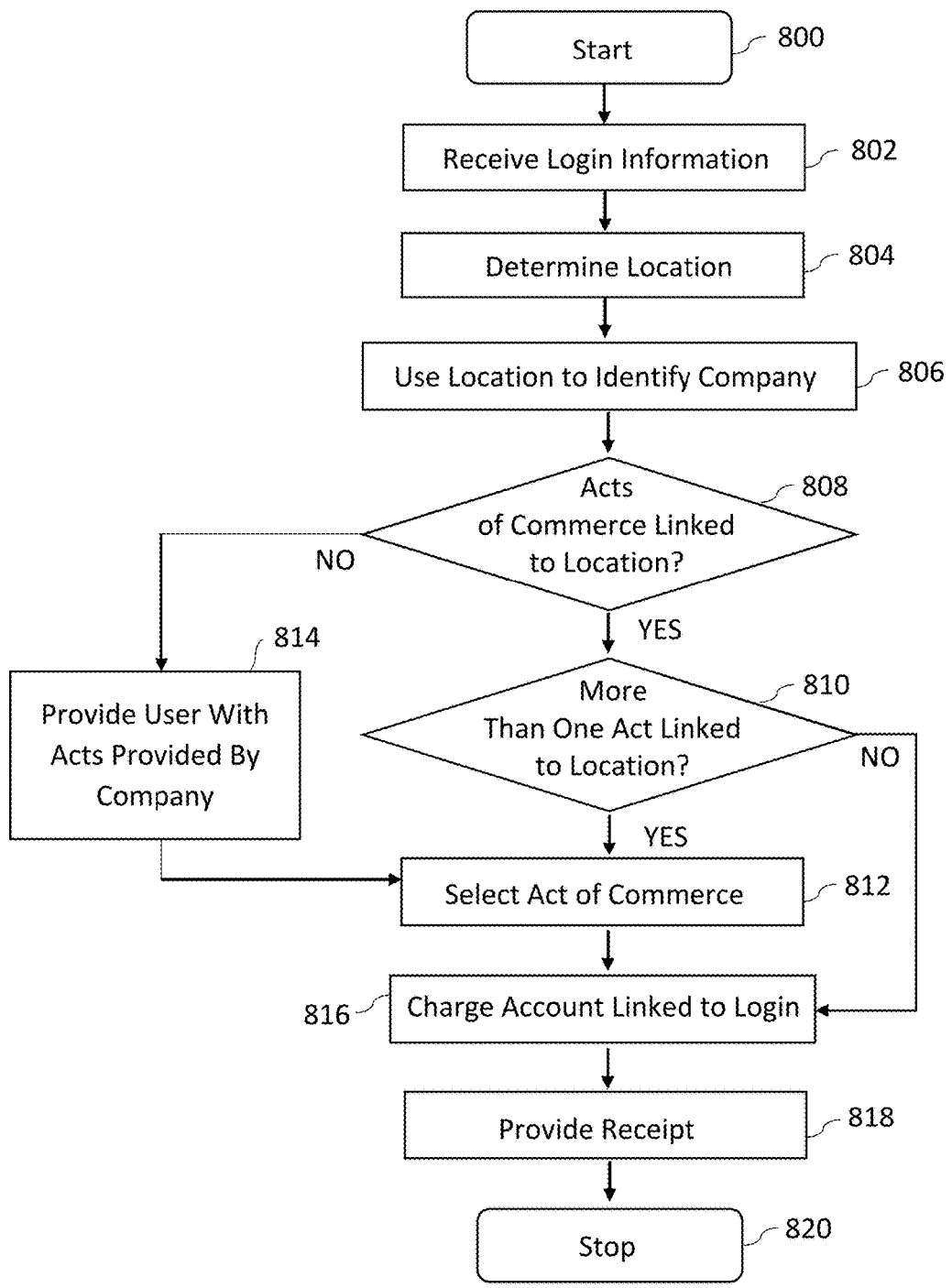
FIG. 8 depicts a method for using at least location information to facilitate a transaction in accordance with one embodiment of the present invention.

One method of using location information to facilitate a transaction is depicted in FIG. 8. Starting at step 800, login information is received at step 802. Login information may include user name and password, or more secure information such as biometric data of the first party (e.g., data on the user's fingerprints, iris, retina, facial features, speech recognition, EKG, etc.). Login information may also include a unique key, or a key unique to the mobile application and/or mobile device. The key could be either communicated or used to encode/decode and/or encrypt/decrypt communications between the mobile application and the host device. Once received, the login information can be used to locate the first party's account. The first party's account is an account that is linked to the mobile application, the mobile device, and/or at least one payment method (e.g., the user's credit card, debit card, etc.). The location of the mobile device is then determined at step 804. Location can be determined by the mobile application, by the host device based on information provided by the mobile application, or by information provided by a third party (e.g., the centralized device in a distributed system, etc.). Once determined, location is then used to identify a second party (e.g., a merchant, a store, a kiosk, etc.) at step 806. This may be accomplished using a second party/location map stored on the host device or information available by a third party (e.g., Google Maps™, etc.).

At step 808, a determination is made as to whether the second party is linked to a pending act of commerce (e.g., a pending order for goods and/or services). Pending acts of commerce are generally orders for goods/services that may or may not be linked to time or a time period (e.g., within a thirty second window, etc.). If the answer is "yes," then a determination is made at step 810 on whether there is more than one order pending. If the answer is "no," then the first party's account, or payment method linked thereto, is charged for the order at step 816. A receipt is then provided to the mobile application and/or the merchant device at step 818 ending the method at step at 820.

If at step 808, the answer is "no," then a menu of available acts of commerce (e.g., goods and/or services provided by the second party) are provided to the mobile application at step 814. The first party (user) can then select a particular act of commerce that the user would like to purchase at step 812, and the first party's account (or payment method linked thereto) is charged at step 816. A receipt is then provided to the mobile application and/or merchant device at step 818, ending the method at step 820.

If at step 810, the answer is "yes," then the first party (user) may select their order at step 812. Alternatively, the host may select the correct order by associating data received from the merchant device and/or the mobile application (e.g., user name, order number, specific location (e.g., cash register one), specific accessory (e.g., shopping cart, shopping basket, etc.), time period, etc.) with a particular order. The first party's account (or payment method linked thereto) is then charged for the selected/identified order at step 816. A receipt is then provided to the mobile application and/or merchant device at step 818, ending the method at step 820.

It should be appreciated that the present invention is not limited to the steps illustrated in FIG. 8, and fewer, additional, or different steps are within the spirit and scope of the present invention. For example, if only the first party is allowed to place an order (e.g., via the application), then steps 808 and 810 may be deleted, with step 814 being located between steps 806 and 812. By way of another example, if only the second party is allowed to place an order (e.g., via the merchant device), then step 814 may be deleted. By way of yet another example, before charging the first party's account (or payment method linked thereto), the first party may be required to acknowledge the order before their account is charged. By way of yet another example, if the first party is allowed to place an order at step 812, the method may also determine whether the current time is within a particular time window. For example, if a store or kiosk is only open from 9-5, then a determination may be made as to whether the current time (e.g., time that the transaction is being made, etc.) is within this window of time. This step may be performed before step 812 (e.g., immediately before step 812, before step 814, etc.) or after step 812, before the account is charged at step 816. It should also be appreciated that the present invention is not limited to the steps being performed in the order illustrated in FIG. 8. For example, the mobile application could determine the device's location before login information is received.

As previously discussed, location information can also be used (along with biometric data) to authenticate the user. For example, the host may ensure that the user is at a particular (e.g., authorized) location before a transaction can be processed. For example, if the user is attempting to perform an ATM transaction, the host may require that the user (along with the mobile device) be located in front of the ATM. Similarly, if the user is attempting to perform a store transaction, the host may require that the user (along with the mobile device) be located inside the store or be leaving the store. When dealing with a merchant, such a feature could be used to prevent transactions from remote (or unauthorized) locations or allow transactions from local (or authorized) locations. For example, such a feature may allow a user to withdraw money from an ATM only when the user is standing in front of the ATM, allowing the user to be imaged by security cameras. By way of another example, the host may allow the user to perform remote transactions only when the user is located at an authorized location (e.g., the user's home, etc.). Maps for storing such information are discussed in greater detail below.

Figure 9:
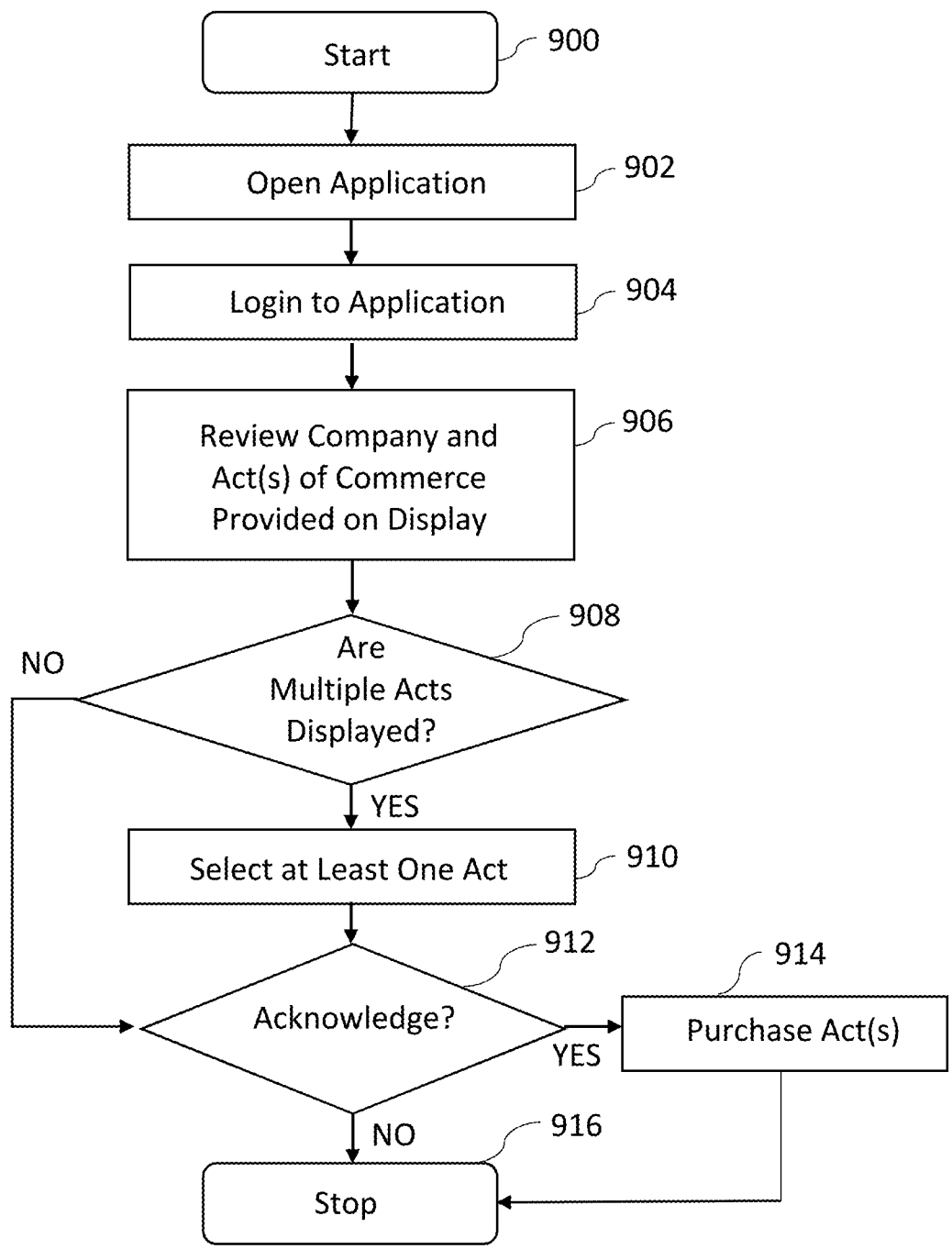
FIG. 9 depicts a method for using a mobile application to facilitate a transaction in accordance with one embodiment of the present invention.

One method of using a mobile application to facilitate a transaction is depicted in FIG. 9. Starting at step 900, the application is open at step 900. The first party (user) may then enter login information at step 904. As discussed above, the login information may include user name, password, biometric data, location information, etc., and may further require the use of a unique key. At step 906, the first party (user) would be provided with information associated with the location. This may include data on the second party (e.g., store name, logo, etc.) and/or data on acts of commerce (goods and/or services) provided by the second party. By providing data on the second party, the user can confirm that the application is functioning properly (e.g., the store identified is the one that they are in, etc.). Data on the acts of commerce can either be a menu of available goods and/or services and/or at least one pending order. At steps 908 a determination is made as to whether multiple acts of commerce are provided (e.g., a menu of goods and/or services, multiple pending orders, etc.) or whether a single act of commerce is provided (e.g., only one good or service is available, only one pending order, etc.). If the answer is "yes," then the first party (or in an alternate embodiment, the host) must select one act of commerce at step 910. If the answer is "no," then no selection is necessary. At step 912, the single act of commerce (as provided or selected) is acknowledged. If the act (or order) is not acknowledged, then the method stops at step 916. However, if the act (or order) is acknowledged, then the first party's account (or payment method linked thereto) is charged at step 914, ending the method at step 916.

It should be appreciated that the present invention is not limited to the steps illustrated in FIG. 9, and fewer, additional, or different steps are within the spirit and scope of the present invention. For example, a receipt or proof of purchase may be provided to the mobile application and/or merchant device after step 914. By way of another example, the user may need to select an option (e.g., "pay now," etc.) to trigger matching the location with a particular act of commerce. This may be performed before, after, or during step 906 and would allow the system to more closely synch the placing of an order (e.g., by a cashier) and a request for payment (e.g., by the user). By way of yet another example, the user may have the option of selecting a time for when the act of commerce should be performed. This would allow, for example, the first party to schedule a future act of commerce and may require the host device determining whether the selected time is within an acceptable window of time (e.g., during business hours, etc.). It should also be appreciated that the present invention is not limited to the steps being performed in the order illustrated in FIG. 8.

Figure 10A:
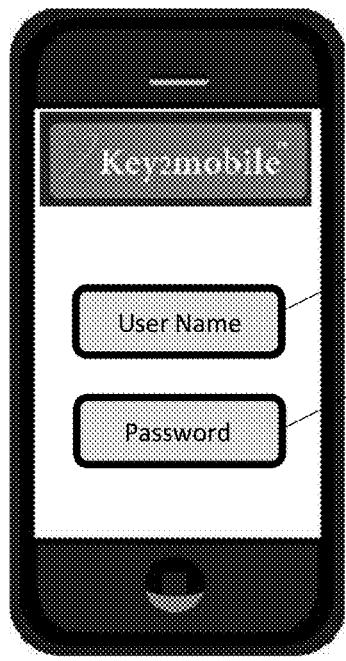
FIGS. 10a-f depict exemplary screen shots of a mobile application being used to facilitate a transaction in accordance with one embodiment of the present invention.
Figure 10B:

FIGS. 10a-10f depict exemplary screen shots of a mobile application being used to facilitate a transaction. For example, as shown in FIG. 10a, a Key2Mobile™ (or other owner of the mobile application) login screen may be provided to the first party. In this example, the first party enters a user name and password. However, other verifying information may be provided or used including biometric data (e.g., fingerprint, iris, retina, facial features, speech recognition, EKG, etc.), a unique key (which may be entered or stored on the mobile device and used to either uniquely identify the mobile application and/or or to encode/decode and/or encrypt/decrypt communications between the mobile application and the host device), etc. Once the first party logs into the application, the application may determine a location for the mobile device, which may be the actual location, or an approximate (or estimated) location, and may be acquired using one or more known techniques (e.g., using communications with at least one cell tower, satellite, radio head, etc.).

Figure 10C:
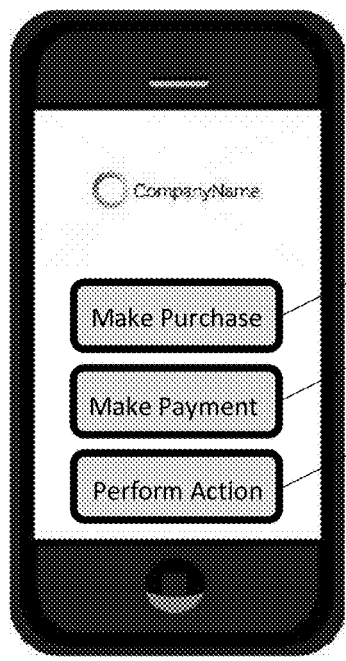
Figure 10D:
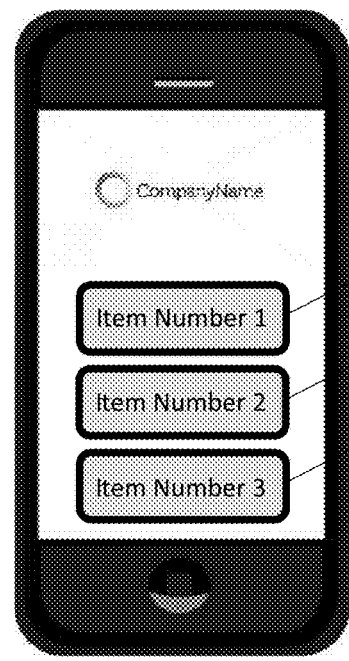

Once the location has been determined, it can be used (either alone or together with other information, such as time, etc.) to authenticate the user (or transaction) and/or identify a second party, such as a merchant or an entity associated with the location. Once the second party is identified, it can be provided to the user via the application (see, e.g., FIG. 10c, "CompanyName" with logo). The user can also be provided with options associated with the second party. In one embodiment of the present invention, as shown in FIG. 10c, this may include high-level options that can be facilitated by the mobile application. For example, assume a user walks into a cellular telephone store. If he/she is there to change their cellular telephone plan, he/she may select the "perform action" 1010 option, which may include the sub-category "change cellular telephone plan" (not shown). The host device would then notify the store of this request for assistance. If the user is there to pay his/her cellular telephone bill, the user could select the "make payment" 1008 option. The host could then use information stored in the database or information entered by the user (e.g., the user's telephone or account number) to make a payment. If the user is there to make a purchase, he/she may select the "make purchase" 1006 option. The user may then be provided with at least one act of commerce that the second party offers, depending on how the system, application, and/or second party is configured. If there is a pending order for the user (e.g., if the user just placed an order with a cashier), then a single act of commerce may be provided to the user. Otherwise, the user may be provided with a menu of acts of commerce offered by the second party. This is shown in FIG. 10d, where the user can select from "item number 1" 1012, "item number 2" 1014, and "item number 3" 1016.

Figure 10E:
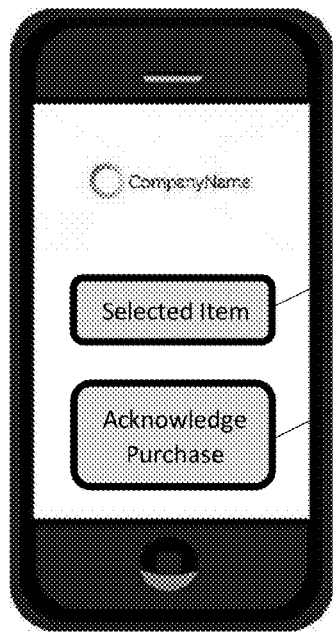
Figure 10F:
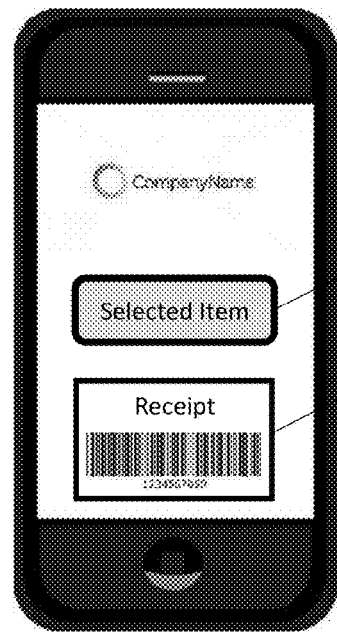

The "selected item" 1018 may then be provided to the user, along with an "acknowledge purchase" 1020 option (see FIG. 10e). If the user acknowledges the purchase, the host device will be notified, the payment method linked to the user's account will be charged, and a proof of purchase (e.g., receipt) will be provided to the user and/or merchant, thereby completing the financial transaction (see FIG. 10f). It should be appreciated that the present invention is not limited to the screen shots depicted in FIG. 10a-f, as the screen shots are merely exemplary. Depending on (i) how the system is configured, (ii) the information available to the host on the second party, and (ii) options selected by the first party, will dictate the type of information provided to the user and/or merchant and the order in which the information is provided.

Figure 11:
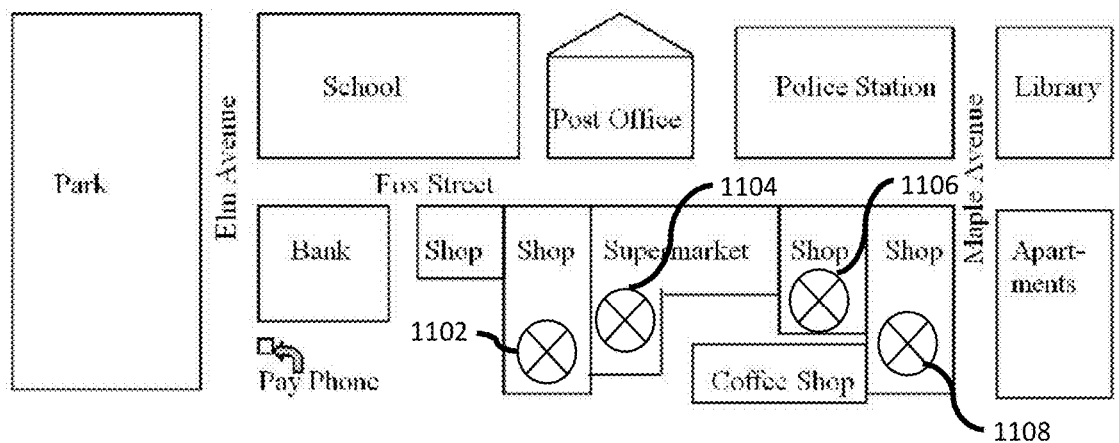
FIG. 11 illustrates use of the present invention to locate a mobile device within one of a plurality of establishments.

A critical aspect of the invention is determining the location of the user, or more particularly the user's mobile device. As discussed above, this may be the actual location of the device or a more general location of the device. In one embodiment of the present invention, as shown in FIG. 11, the system only needs to determine which second party (e.g., store, etc.) the device is located. If the device is located in the shop 1102, then acts of commerce associated with that second party can be provided to the user. Similarly, if the device is located in the supermarket 1104, then acts of commerce associated with that second party can be provided to that user. The same holds true for the shops 1106 and 1108.

Figure 12:
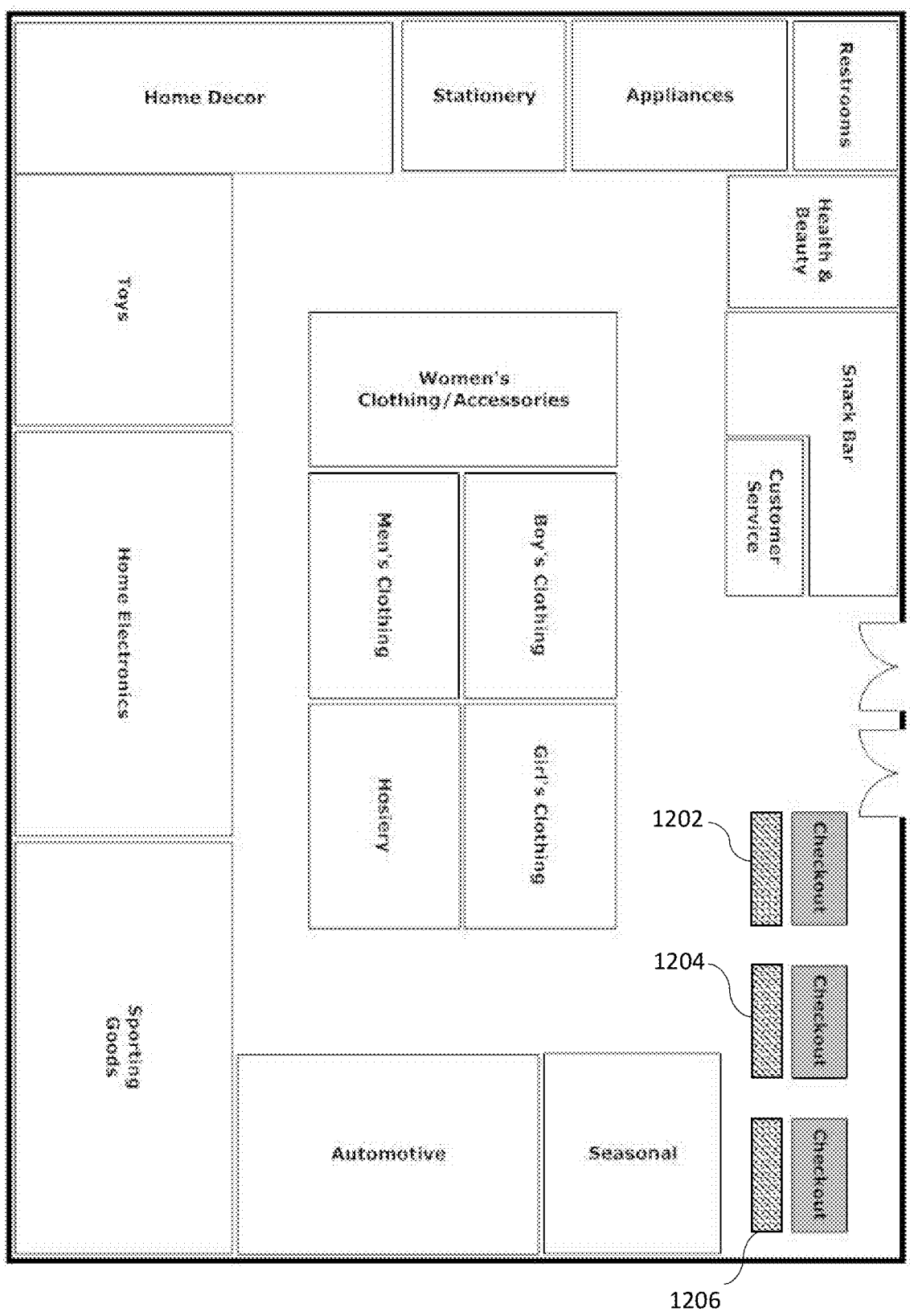
FIG. 12 illustrates use of the present invention to locate a mobile device within an establishment.

In another embodiment of the present invention, as shown in FIG. 12, location of the device is used to determine more than just the second party. In this embodiment it is used to identify where inside the second party the device is located. For example, the device could be in front of a first checkout 1202, a second checkout 1204, or a third checkout 1206. This embodiment allows multiple pending orders to be linked to the proper user, or mobile application operating on a mobile device. For example, if the user is standing in front of the first checkout 1202, and the cashier at the first checkout just entered an order, then that order can be associated with the user regardless of other orders entered by the second or third checkout 1204, 1206, or other applications operating on other mobile devices.

While specific embodiments have be provided for using at least location information to facilitate a transaction, the present invention is not so limited. For example, as discussed above, the present invention could be used to access secure information (e.g., from a database on a host device (see, e.g., FIG. 3 at 10 and 16), from a second computer via a host device (see, e.g., FIG. 3 at 10 and 40), etc.). For example, a user may be allowed to access, or be provided with, secure information if the user is in possession of, or using, a verified (mobile) computing device and verified login, biometric, and/or location data is provided/acquired. In other words, a remote computing device (e.g., host device, second computing device, etc.) may be configured to provide secure information to a particular (mobile) device (e.g., one that is running a particular (mobile) application, one that has at least one unique key (e.g., for encoding, decoding, encrypting, decrypting, etc.), etc.) only if the remote device receive proper login data (e.g., user name, password, etc.), proper biometric data (e.g., biometric data (e.g., fingerprint data, iris data, speech data, EKG, etc.) corresponding to the user, etc.), and/or proper location data (e.g., confirming that the (mobile) computing device is at a proper or authorized location). For example, a host device for a law firm may only allow devices that are located within the law firm to access confidential, sensitive, and/or privileged information.

By way of another example, the present invention could be used for delivery confirmation of goods. For example, a delivery person (or drone, robot, etc.) may only leave goods with an individual if the individual is using a particular (mobile) device (e.g., one that is running a particular (mobile) application, one that has at least one unique key, etc.) and the host device receives/confirms proper login, biometric, and/or location data. If the host device confirms that the password and/or biometric data matches the individual (e.g., user name, etc.), and/or the location of the (mobile) device matches the order (e.g., corresponding to the goods), then delivery confirmation is provided. This may be accomplished by providing a receipt (e.g., barcode, etc.) to the individual's (mobile) device, which can be presented to (and scanned by) the delivery person (or drone, robot, etc.) for delivery confirmation.

It should be appreciated that while location data (e.g., an authorized location) may be used to authenticate or verify a user (or first party), it may also (or instead) be used to authenticate or verify a delivery person, drone, robot, etc., ensuring that they are at the correct location (e.g., an authorized location) and/or allowing the item to be secured if the user (or first party) is not available. For example, as shown in FIG. 29, a delivery person delivering an item to building A would generally leave the item on the sidewalk D, in front of door 2902. Similarly, an item for building B would be left on sidewalk D, in front of door 2904, and an item for building C would be left on sidewalk D, in front of door 2906, etc. The present invention can be used, however, to place the item inside the building or with a secured enclosure. For example, a delivery person (e.g., UPS, FedEx, Amazon Prime, etc.) may open or log into a mobile application on their mobile device, where the application identifies the location of the mobile device (as previously described). If it is determined that the delivery person is at or near (e.g., standing in front of, within a predetermined distance from, etc.) a location where the item is to be left (e.g., authorized location), then the application could be used provide access to (e.g., unlock) a building or a secured enclosure.

In particular, the mobile application may be used to provide location information along with other data (e.g., user name, password, at least one biometric, package identification information (e.g., a unique barcode (or ID) for the item, recipient data (e.g., name, address, etc.), order identification information (e.g., order number, etc.), sender data (e.g., name, address, etc.), shipping data (e.g., ship date, shipping method, etc.), etc.) to the host device. The host device could then use this information to determine whether access should be granted. For example, if the delivery person is authenticated or verified (e.g., using login information, such as user name, password, biometrics, etc.) and at a location that matches or is closely related to (e.g., within a predetermined distance from, etc.) a location associated with the item (e.g., a location linked to the package or order ID, etc.), then the host device (or an application operating thereon) would instruct a network-enabled device within (or in communication with) the building (see, e.g., FIG. 30 at 3002) to provide the delivery person with access to the building or a secured enclosure associated therewith.

For example, in FIG. 29, if a person delivering an item to building A is at the authorized location (e.g., standing in front of or near door 2902), then the host device may instruct a network-enabled device within or in communication with building A to temporarily unlock door 2902, thereby allowing the person to place the item safely inside the building. The network-enabled device may then relock the door 2902 after the item is inside. For example, the door may be relocked a predetermined time after the door is unlocked (e.g., unlock the door, wait a predetermined time (e.g., 15 seconds, etc.), relock the door). By way of another example, the host may instruct the network-enabled device within the building to relock the door (e.g., a predetermined time after instructions have been provided to the network-enabled device to unlock the door, after it is determined that the delivery person (or their mobile device) has left the building or the authorized location, etc.).

In situations where access to the building (or the main portion thereof) is not desirable (e.g., due to pets or for other security reasons), the present invention can be used to grant access to only a portion of the building or to a secured enclosure associated therewith. For example, if a person delivering an item to building B is at the authorized location, then the host device may instruct a network-enabled device within or in communication with building B to temporarily unlock door 2904, where door 2904' remains locked. By doing this, the person only has access to a landing or airlock, and does other portions of the building, i.e., portion B'. By way of another example, if a person delivering an item to building C is at the authorized location, then the host device may instruct a network-enabled device within or in communication with building C to temporarily unlock secured enclosure 2906', where door 2906 remains locked. By doing this, the person only has access to the secured enclosure, and does not have access to the building itself.

Figure 30:
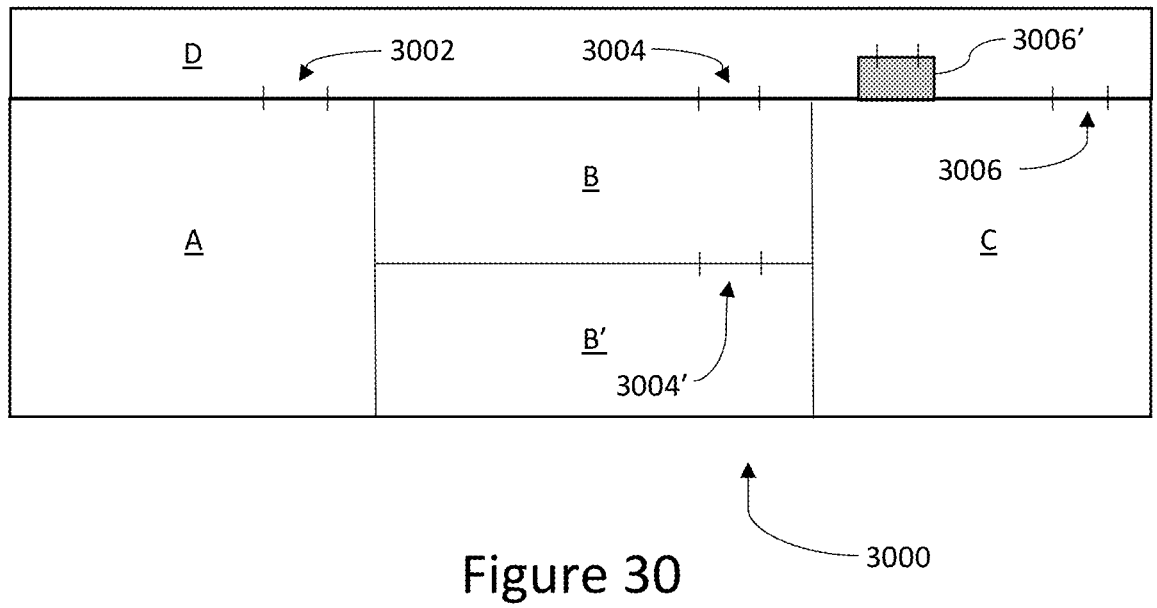
FIG. 30 depicts an embodiment of the present invention, where at least location information is used to deliver an item to a location associated with the user (e.g., the user's house, etc.), without requiring the user to be present.
Figure 31:
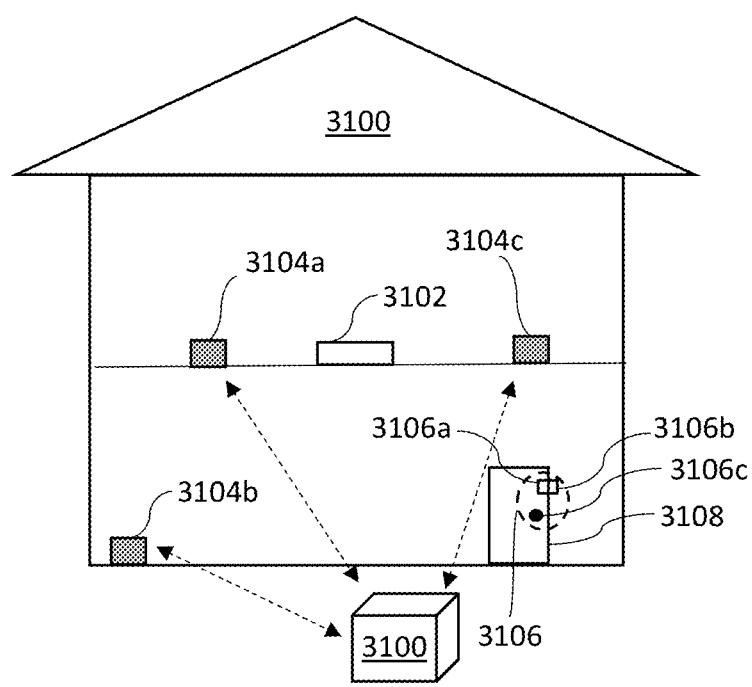
FIG. 31 depicts an embodiment of the present invention, allowing a mobile application to determine the location associated with the user and to request access to said location.

In determining whether the mobile device is at an authorized location, the application could use one or more known techniques, including those depicted in FIG. 5. For example, the mobile device (or application operating thereon) could use cell towers or satellites to determine its location. Also, or alternatively, a WiFi-based positioning system could be used to determine the device's location. For example, as shown in FIG. 30, a building 3000 may have a plurality of wireless access points (or WiFi hotspots) (e.g., 3004a, 3004b, 3000c) and a network-enabled device 3002 in communication with at least one door locking/unlocking mechanism 3006. A mobile device (or application operating thereon) can then use signal strengths of and identifiers (e.g., SSID, MAC address, etc.) for the access points and a corresponding database (e.g., associating each access point with its location) to determine the device's location. If the mobile device is at an authorized location, then the network-enabled device 3002 is instructed (e.g., by the host device, etc.) to unlock door 3008. This may be done by disassociating portions 3006a (e.g., deadbolt, etc.) and 3006b (e.g., door jam, etc.) from one another, or by unlocking door handle 3006c.

It should be appreciated that FIGS. 29 and 30 are not intended to limit the present invention, but merely to provide examples of how the present invention can be used to secure the delivery of items when the recipient is not available. As such, other embodiments are within the spirit and scope of the present invention. For example, other secured enclosures (e.g., lockers, etc.), other methods for providing access to such enclosures (e.g., remotely-located, network-enabled access points), and other access-granting factors (e.g., time, where access is only granted during a time (or window) when the item is expected to be delivered), are within the spirit and scope of the present invention.

In alternate embodiments, a receipt may also (or instead) be provided to a mobile device carried by the delivery person. If the goods are electronic in nature, delivery confirmation may also (or instead) be provided to the goods, where delivery confirmation results in at least one function being performed. For example, in the case of a vehicle, the vehicle may require delivery confirmation before it allows entry and/or operates properly. By way of another example, in the case of a computing device (laptop, smartphone, etc.), the device may require delivery confirmation before it operates properly.

Figure 13:
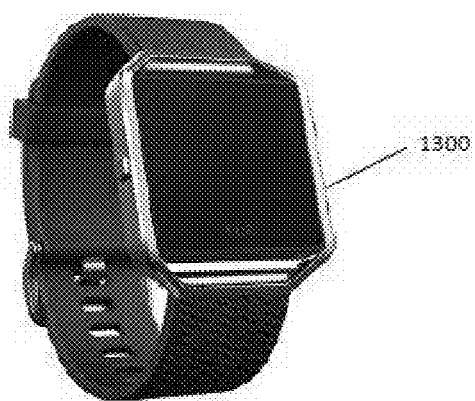
FIG. 13 depicts an exemplary smartwatch, which can be configured to function in accordance with alternate embodiments of the present invention.

As discussed above, in one embodiment of the present invention, the mobile device may be a wearable device, such as a smartwatch (see FIG. 13). While a wearable device may function similarly to the more generalized mobile device (discussed above), it may differ in how information is provided to the user. This is due to the fact that wearable devices are generally small, and therefore have limited screen sizes. As such, the amount of information that can be presented to (or received from) a user is limited.

Figure 14A:
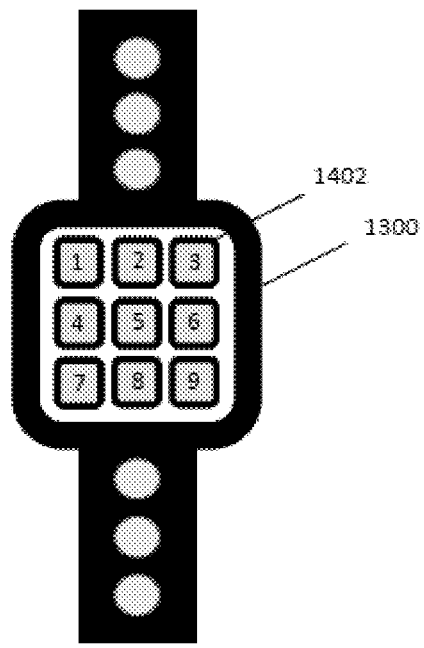
FIGS. 14a-e depict exemplary screen shots of a mobile application being used to facilitate a transaction in accordance with alternate embodiments of the present invention.
Figure 14B:
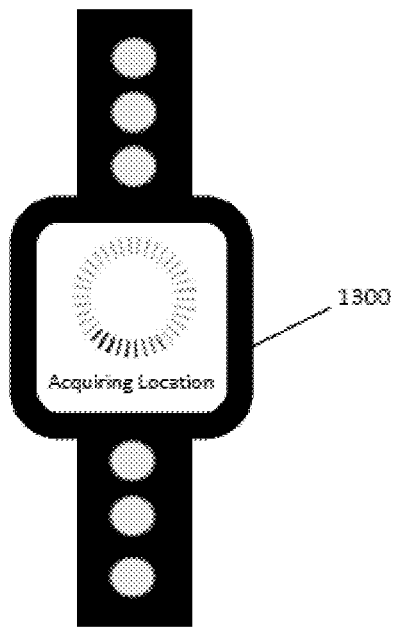
Figure 14C:
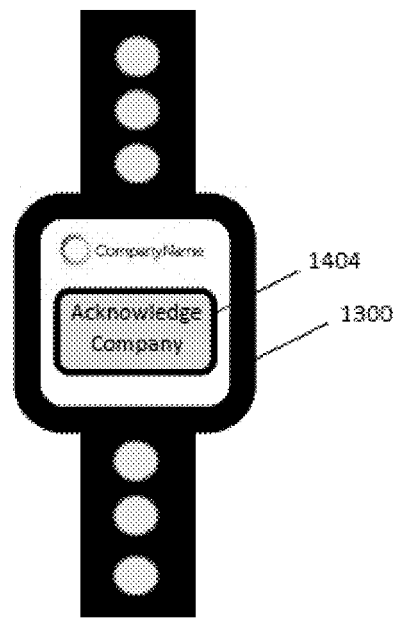
Figure 14E:
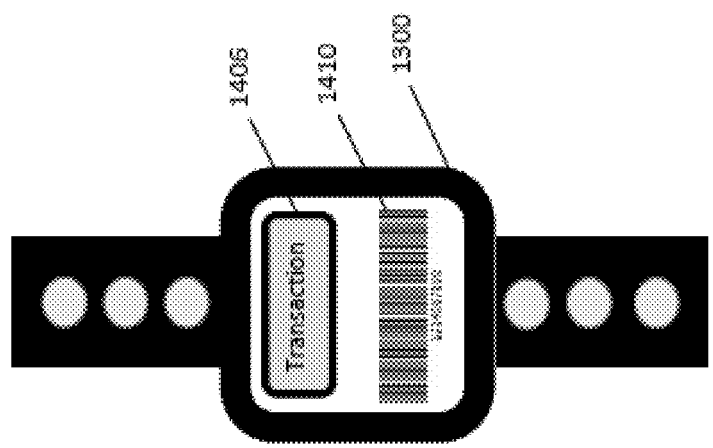
Figure 14D:
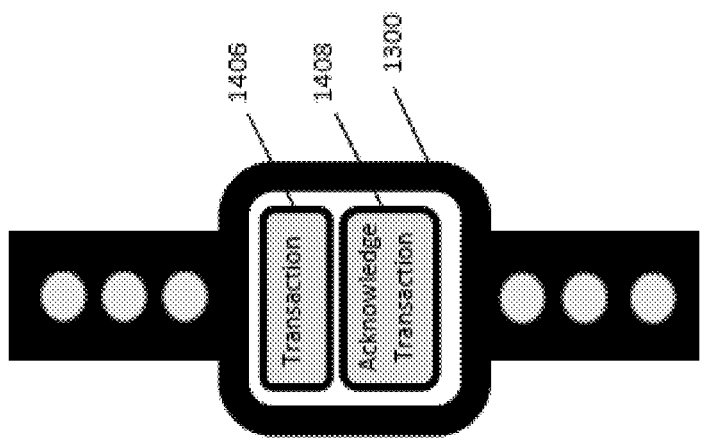

FIGS. 14a-14e depict exemplary screen shots of a mobile application being used on a wearable device to facilitate a transaction. For example, as shown in FIG. 14a, a simplified login screen may be provided to the first party. In this example, the first party enters a Personal Identification Number (PIN) or password associated with the user's account. However, other verifying information may also (or alternatively) be provided and/or used including name, biometric data (e.g., fingerprint, iris, retina, facial features, speech recognition, EKG, etc.), a unique key (which may be entered or stored on the mobile device and used to either uniquely identify the mobile application and/or or to encode/decode and/or encrypt/decrypt communications between the mobile application and the host device), etc. Once the first party's account is identified, the application may determine a location for the mobile device (see FIG. 14b), which may be the actual location, or an approximate (or estimated) location, and may be acquired using one or more known techniques (e.g., using communications with at least one cell tower, satellite, radio head, etc.).

Once the location has been determined, it can be used (either alone or together with other information, such as time, etc.) to authenticate the user (or transaction) and to identify a second party, such as a merchant or an entity associated with the location. Once the second party is identified, it can be provided to the first party via the application (see, e.g., FIG. 14c, "CompanyName" with logo), along with an option 1404 to acknowledge the second party (i.e., acknowledge that the identified company is the correct company). In one embodiment, the first party (e.g., wearing the wearable device) may approach (physically) the second party (or an employee, agent, or kiosk thereof or associated therewith) and make a purchase (e.g., via a POS device). The purchase may then be provided to the host device (e.g., from the POS device), and displayed to the first party (e.g., via a "Transaction" icon 1406). The first party may then have the option of confirming the order (e.g., via an "Acknowledge Transaction" button 1408). If the order is confirmed, then a payment method (e.g., linked to the first party's account, selected by the first party from a list of available options (not shown), etc.) may be charged (if appropriate), and a receipt will be issued to the first party, which may include transaction information 1406 and/or a unique barcode 1410. Similar information may also be provided to the second party (or the POS device), confirming that payment has been received, and that goods/services (as purchased, requested, etc.) should be rendered.

It should be appreciated that the present invention is not limited to the screen shots depicted in FIG. 14a-e. Depending on (i) how the system is configured, (ii) the information available to the host on the second party, (iii) the type of mobile device used (the mobile application may be configured to detect the type of mobile device and share this information with the host device), and (iv) options selected by the first party, will dictate the type of information provided to the user and/or merchant and the order in which the information is provided. For example, instead of interacting with an employee, agent, or kiosk to make a purchase, the first party may use the mobile application to select at least one good/service from a plurality of goods/services offered by the second party. To do this, the application may provide the first party with the plurality of goods/services offered by the second party. Depending on the type of device that is being used (e.g., smartphone, smartwatch, etc.), the plurality of goods/services may be shown on one screen (see, e.g., FIG. 10d), or may be cycled through by the first party (e.g., by clicking a "next" or "->" button(s)) (not shown)). Once a selection has been made, the first party may be allowed to confirm the purchase (see, e.g., FIG. 14d) and/or may receive a receipt for the purchase (see, e.g., FIG. 14e).

Figure 15A:
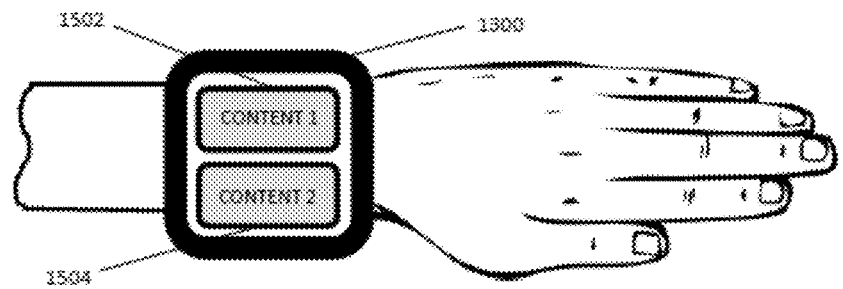
FIGS. 15a-c depict exemplary ways of providing information to a user of the smartwatch in accordance with alternate embodiments of the present invention.
Figure 15B:
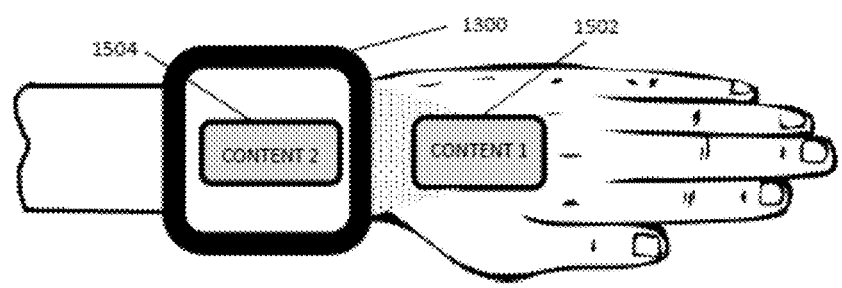
Figure 15C:
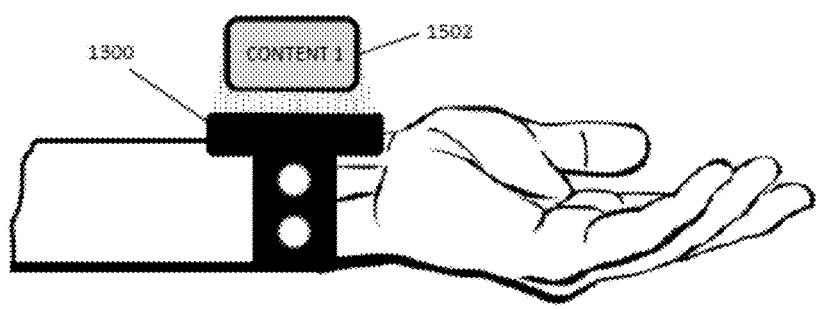

As mentioned above, when it comes to a wearable device, screen size may be limited, and may thereby limit the amount of information that can be displayed to the first party at one time. As shown in FIG. 15a, the wearable device 1300 may be configured to display both first and second content 1502, 1504 on the device's screen (either simultaneously, as shown, or sequentially, as described above). Also, or alternatively, the second content 1504 could be displayed on the device's screen, while the first content 1502 is displayed elsewhere (or vice versa). For example, as shown in FIGS. 15b and 15c, the first content 1502 could be projected using a projection device, e.g., onto a surface, such as the user's hand, the user's wrist, a wall, a table, or a windshield, or into the air (e.g., as a hologram). This can be accomplish using technology developed by Samsung™ (e.g., Galaxy Beam™), Apple™ (e.g., Miroir HD Projector™), Cicret™ (e.g., Bracelet™), Microsoft™ (e.g., HoloLens™), Virtual Presence™, Magic Leap™, Daqri Holographics™, and Holoxia™, to name a few.

Figure 16:
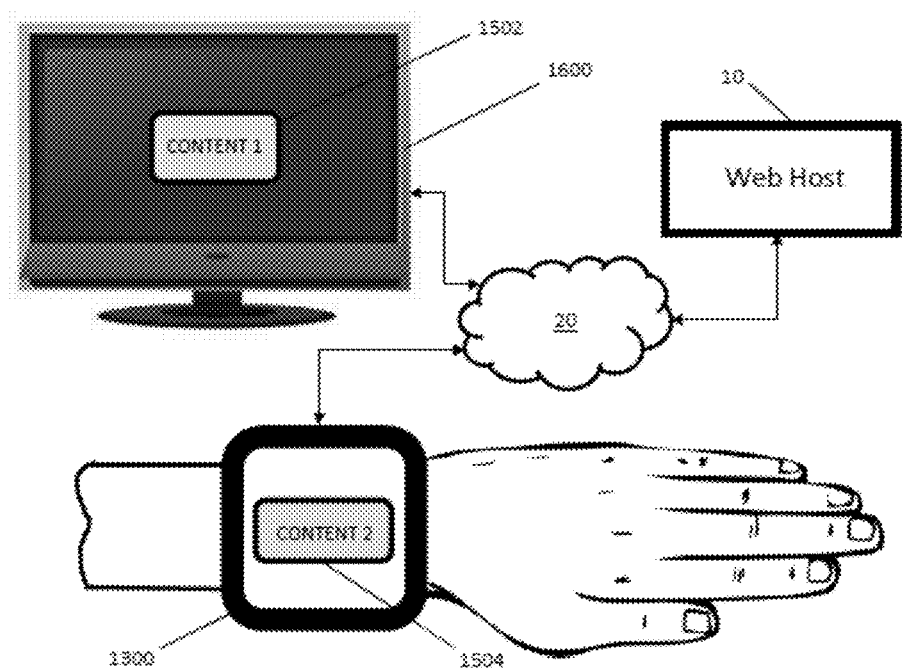
FIG. 16 depicts yet another way of providing information to a user of a mobile device, such as a smartphone or a smartwatch.

It can also be accomplished using a separate display device. For example, if a wearable device (e.g., a smartwatch) is in communication with the host device via an intermediate device (e.g., a smartphone), then second content may be displayed on the wearable device's screen, and first content may be displayed on the intermediate device's screen (or vice versa). In another example, as shown in FIG. 16, a wearable device 1300 (e.g., a smartwatch, etc.), which is connected to the host device 10 via a WAN 20, may be configured to display the second content 1504, while the first content 1502 is displayed on a network-enabled device 1600 (or vice versa). In other words, information that is to be presented to the first party can be done so using the wearable device 1300 and/or the network-enabled device 1600, which may be owned and/or operated by the first party, the second party, or a third party.

Figure 18A:
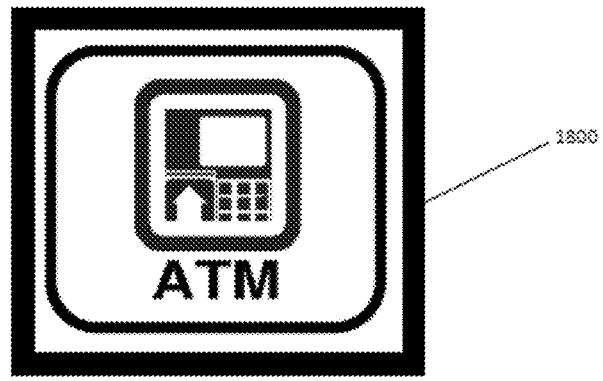
FIGS. 18a-c depict exemplary uses for the present invention, including, but not limited to, facilitating a banking transaction, a gambling transaction, and/or an entertainment transaction.

For example, as shown in FIG. 18a, an ATM may be configured to display the first content (e.g., data on the first party (e.g., John Smith, accounts held by John Smith, etc.), the second party (e.g., Bank of America, etc.), goods/services offered by the second party (e.g., Withdraw Funds, Transfer Funds, etc.), and/or the first party's transaction request (e.g., Withdraw $20 from John Smith's checking account, etc.). The first party could then use the wearable device to facilitate the transaction, where the wearable device is configured to display the second content (e.g., data on the first party, second party, goods/services offered by the second party, the first party's transaction request, data related thereto, etc.). By way of example only, a first party, standing in front of an ATM, may open and log into the mobile application. Using the location of the wearable device, the mobile application may identify the ATM, and ask the first party (via the wearable device's display) to confirm whether they would like to use the application to facilitate a transaction with the ATM (see, e.g., FIG. 14c). If the first party answers in the affirmative, the ATM may then ask the first party (via the ATM's display) to enter their Personal Identification Number (PIN). The first party may then enter their PIN on the wearable device (see, e.g., FIG. 14a). If the provided PIN matches a predefined PIN (as determined by the host device, the ATM, the financial institution, etc.), the host device may then provide the first party with a plurality of options, such as withdraw money, make a transfer, etc. The options can either be provide on the wearable device (see, e.g., FIG. 10d) or provided on the ATM. However, if the options are provided on the ATM, the options should correspond to entries on the wearable device (e.g., press "1" for withdraw, "2" for transfer, etc.). By selecting the appropriate option, which may further require selecting the appropriate sub-option (e.g., enter the amount to withdraw, etc.), the wearable device may ask the first party to confirm the requested transaction (see, e.g., FIG. 14d). A receipt may then be provided to the first party (e.g., via the wearable device (see, e.g., FIG. 14e), via a printout from the ATM, etc.), and the requested transaction is performed (e.g., $20 is dispensed from the ATM, etc.).

Figure 18B:
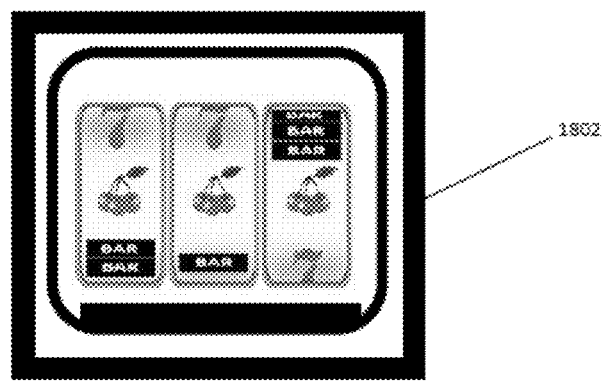

As shown in FIG. 18b, the same technology could be used to interact with a gaming device, such as a slot machine. For example, while the first party is seated in front of a gaming device, the mobile application could be used to add money to the gaming device (instead of inserting money or a voucher), retrieve money from the gaming device (instead of dispensing money or a voucher), and/or play the gaming device. If a financial transaction is requested, then the sequence of steps may be similar to those used on an ATM (see above). If, however, the wearable device is used to play the game, the gaming device may be used to display options, and the wearable device may be used to select from corresponding entries (e.g., press "1" for slots, "2" for video poker, etc.). It should be appreciated that, depending on the level of interaction, the wearable device may allow the first party to select from corresponding sub-entries. For example, if the gaming device is (or is functioning as) a slot machine, the first party may press "1" (or "spin") to spin the wheels. If the gaming device is (or is functioning as) a video poker machine, then the first party may press any number (or button) to deal the cards, press a corresponding number to hold a card (e.g., press "1" to hold the first card, "2" to hold the second card, etc.), and any other digit ("0," "6-9," "#," or "*") to deal replacement cards.

Figure 18C:
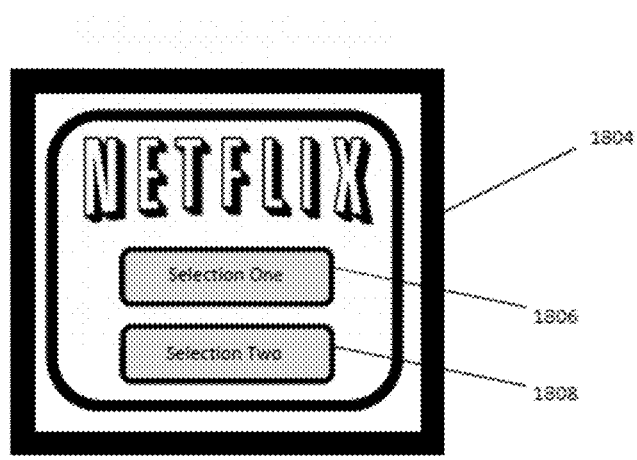

As shown in FIG. 18c, the same technology could be used to interact with a network-enabled monitor, a network-enabled television, or a network-enabled Set Top Box (STB) connected to a television. For example, while the first party is in a hotel room or on an airplane, the mobile application could be used to watch a movie, play a video game, etc. If the first party wants to watch a movie, the TV (or STB) may provide the first party with a plurality of options 1806, 1808. As before, the wearable device may be used to select from corresponding entries, which may be individual movies (e.g., press "1" for the first movie, "2" for the second movie, etc.), or may allow the first party to drill down to a plurality of movies (e.g., press "1" for new releases, "2" for still in theater, etc.). It should be appreciated that the foregoing examples are just that—examples—and are not limitations of the present invention. As discussed above, the present invention could be used in conjunction with any third-party, network-enabled device, regardless of the goods/services that are being provided.

Figure 17:
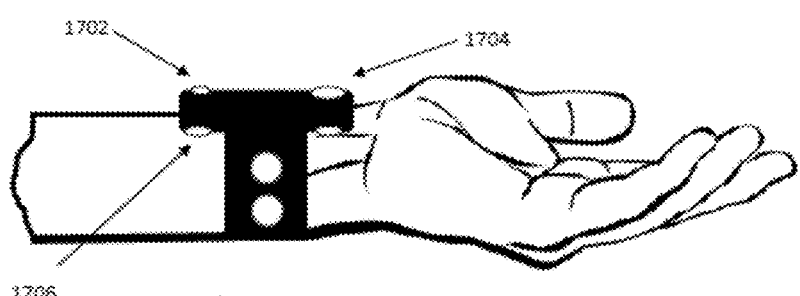
FIG. 17 depicts features that may be includes on a smartwatch, and used to facilitate a transaction, including, sensors (e.g., heartrate sensors, EKG sensors, etc.), a microphone, a camera, and/or projection technology.

In one embodiment of the present invention, as shown in FIG. 17, the wearable device may further include at least one sensor 1706 (e.g., for sensing heart data, EKG data, etc.), at least one camera 1704 (e.g., for capturing image/video data of the first party), and/or at least one microphone 1702 (e.g., for capturing audio data of the first party). Not only do these features increase flexibility (e.g., allow the first party to speak their selection, etc.), but they can also be used to enhance security. For example, audio data may be used along with voice recognition software (e.g., on the host device, etc.) to confirm that the first party is who he/she claims to be. Similarly, image/video data can be used along with facial and/or retinal recognition software (e.g., on the host device, etc.) to confirm that the same. Sensor data (e.g., heart rate data, EKG data, etc.) may be used to confirm that the wearable device is merely being worn at the time the mobile application is being used, or it too could be used to uniquely identify the first party. For example, the University of Toronto has developed technology that turn one's EKG pattern into a unique key, or password that can be used for unique identification. By having possession of the mobile device, having the mobile device at a location where the transaction is to be facilitated, knowing the password, and having (or being able to provide) identifiable biometric data, the mobile application can be used to carry out the most sensitive transactions, such as banking and other financial transactions. And if the mobile device includes a camera 1704, the mobile application may be configured to capture a photo of the user while the transaction is being carried out. The photo could then be provided to the host, analyzed (to ensure that facial features are recognizable, preventing the user from blocking their face, using the device without proper lighting, etc.), and stored together with transaction information. Such use of the mobile device, or the camera feature thereof, should help detour fraudulent usage of the present invention.

Figure 19:
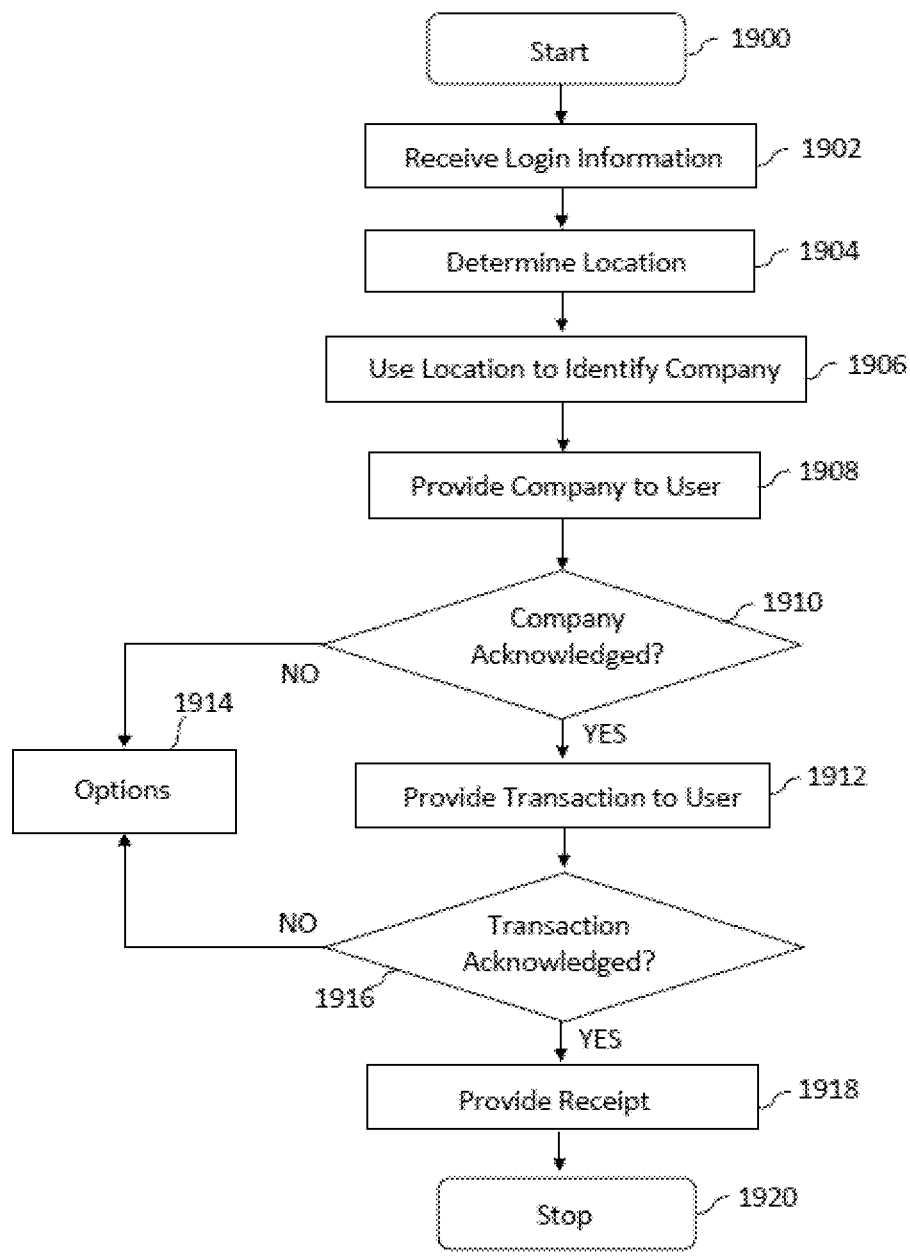
FIG. 19 depicts a method for using at least location information to facilitate a transaction in accordance with another embodiment of the present invention.

One method of using location information to facilitate a transaction is depicted in FIG. 19. Starting at step 1900, login information is received at step 1902. Login information may include user name and password, or more secure information such as biometric data of the first party (e.g., data on the user's fingerprints, iris, retina, facial features, speech recognition, EKG, etc.). Login information may also include a unique key, or a key unique to the mobile application and/or mobile device. The key could be either communicated or used to encode/decode and/or encrypt/decrypt communications between the mobile application and the host device. Once received, the login information can be used to locate the first party's account. The first party's account is an account that is linked to the mobile application, the mobile device, and/or at least one payment method (e.g., the user's credit card, debit card, etc.). The location of the mobile device is then determined at step 1904. Location can be determined by the mobile application, by the host device based on information provided by the mobile application, or by information provided by a third party (e.g., the centralized device in a distributed system, etc.). Once determined, at step 1906, location is then used to identify a second party (e.g., a merchant, a store, a kiosk, etc.), and in certain embodiments, to authenticate the user (or transaction). This may be accomplished using a second party/location map stored on the host device or information available by a third party (e.g., Google Maps™, etc.).

At step 1908, the identified party (e.g., company, etc.) is provided (or displayed) to the first party. At step 1910, a determination is made by the first party as to whether the identified party is the correct party (e.g., the company that the first party wishes to do business with, etc.). If the answer is "no," then the first party may be presented with other options at step 1914, which may include other companies that are nearby (e.g., within a predetermined distance from the mobile device). If, at step 1910, the answer is "yes," then a pending transaction (e.g., a transaction pending with the cashier, entered into the POS, etc.) may be provided (or displayed) to the first party at step 1912. At step 1916, a determination is made by the first party as to whether the pending transaction (as displayed) is correct. If the answer is "no," then the first party may be presented with other options at step 1914, which may include other pending transactions, or a request to enter information that will allow the system to identify the correct transaction. If, at step 1916, the answer is "yes," then a receipt is provided (or displayed) to the first party and/or the second party at step 1918, ending the method at step 1920.

It should be appreciated that the present invention is not limited to the steps illustrated in FIG. 19, and fewer, additional, or different steps are within the spirit and scope of the present invention. For example, if the transaction is a purchase of a good/service, a payment method (e.g., linked to the first party's account, etc.) may be charged before the receipt is provided to the first and/or second party at step 1918. By way of another example, if the first party is allowed to use the mobile application to select the transaction, then a plurality of available transactions may be provided (or displayed) to the first party, and the first party may have an opportunity to select the transaction prior to (or instead of) steps 1912, 1916. By way of yet another example, if the first party is allowed to use the mobile application to select the transaction, then the method may also determine whether the time of the selection is within a particular time window. For example, if a store is only open (or allowed to do business with the mobile application) from 9-5, then a determination may be made as to whether the time of the transaction (e.g., selection, request, etc.) is between 9:00 AM and 5:00 PM.

By way of yet another example, additional login information may be requested by the second party after the second party has been identified at step 1906. For example, if the second party is a financial institution, the first party may be required to enter a Personal Identification Number (PIN) before the mobile application can be used to facilitate a financial transaction. In this example, the PIN would need to be authenticated (e.g., by the host device, the merchant device, the financial institution, etc.) before the first party is allowed to select (or complete) a financial transaction. For example, if the first party is standing in front of an ATM, the first party may be required to enter their PIN, which may be provided to the second party (e.g., the ATM, the financial institution, etc.) via the host device. The second party may then take steps to authenticate the PIN (e.g., determine whether the provided PIN matches a previously provided PIN), and notify the host device of the results. If the PIN is not authentic, then the host device may notify the first party, and end the method. However, if the PIN is authentic, then the host device may provide certain transaction options to the first party (e.g., via the ATM and/or the mobile device, etc.). It should also be appreciated that the present invention is not limited to the steps being performed in the order illustrated in FIG. 19. For example, the mobile application could determine the device's location before login information is received, options could be provided earlier, or later, etc.

It should further be appreciated that while the first party may use the mobile device to provide information to the host device and/or the second party, any device (e.g., the mobile device, an intermediate device, or a network-enabled device (e.g., owned or operated by the second party)) can be used to provide information to the first party. For example, if at step 1914, additional information needs to be provided to the first party, the method continues step 2000 (see FIG. 20), where first content is provided on a first screen at step 2002, and second content is provided on a second screen at step 2004. For example, in the case of an ATM, the first screen (e.g., on the ATM) may be used to provide a series of options to the first party (e.g., withdraw, transfer, etc.), and the second screen (e.g., on the mobile device) may be used to provide corresponding selections to the first party (e.g., press "1" for withdraw, "2" for transfer, etc.). At step 2006, a determination is made as to whether a selection has been received. If the answer is "no," then the method returns to step 2002. If the answer is "yes," then at least the second screen is updated, preferably identifying the selection or providing the first party with a plurality of sub-options. The first party may then be allowed to acknowledge the selection at step 2010. If, at step 2010, the answer is "no," then the method may return to step 2002. If, at step 2010, the answer is "yes," then a receipt may be provided to the first and/or second party at step 2012, ending the method at step 2016.

Figure 20:
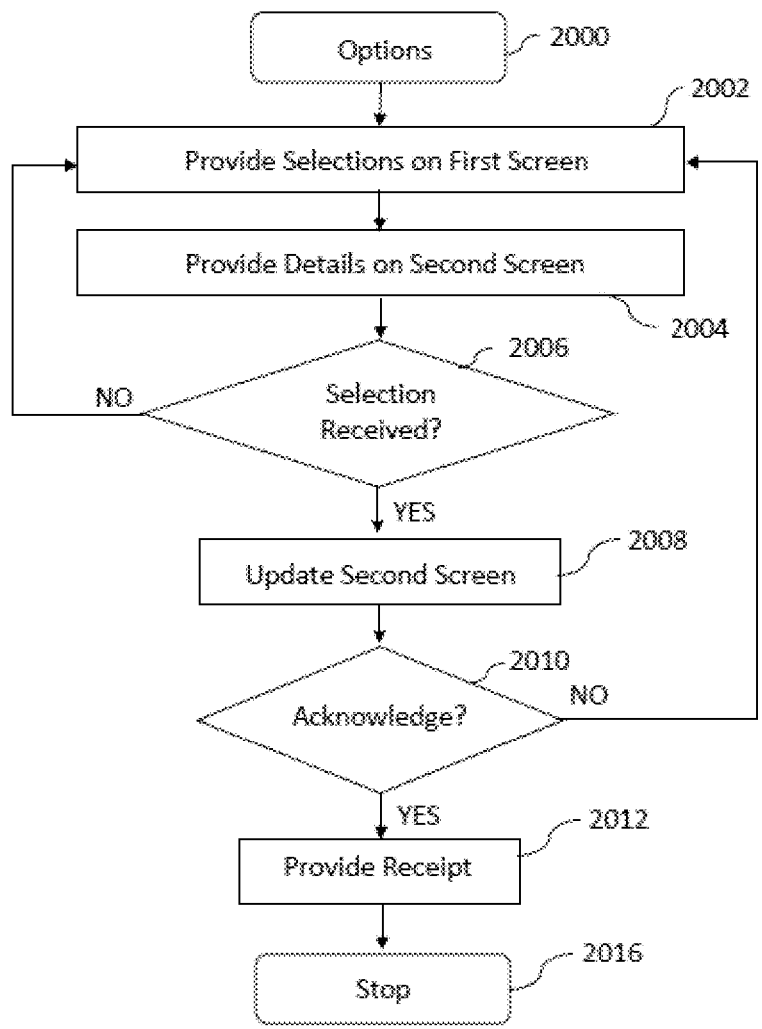
FIG. 20 depicts a method for using at least one mobile application and/or program to facilitate a transaction in accordance with another embodiment of the present invention.

Again, it should be appreciated that the present invention is not limited to the steps illustrated in FIG. 20, and fewer, additional, or different steps are within the spirit and scope of the present invention. For example, if the transaction is a purchase of a good/service, a payment method (e.g., linked to the first party's account, etc.) may be charged before the receipt is provided to the first and/or second party at step 2012. The method may also determine whether the time of the selection is within a particular time window, may update the first screen (instead of or in addition to the second screen) in step 2008, and certain steps (e.g., 2002 and 2010) may be repeated if additional selections are required (e.g., to drill down (e.g., at an ATM, the first party may select "withdraw," followed by "checking," followed by "$20," etc.), to request a map for an item before the item is placed in a shopping cart (e.g., where the map is replaced by information on the item once the item is placed in the cart, etc.), etc.

Figure 21:
FIG. 21 depicts an exemplary database for mapping users to user information, merchants to merchant information, and transactions to transaction information.

As discussed above, the host may store (or have access to) (e.g., via a locally and/or remotely located memory device or database) a map (e.g., look-up table, etc.) that can be used to identify (or look-up information related to) a user's account, a second party (e.g., merchant), or a particular transaction. Such a map is shown in FIG. 21, where information is linked together using fields (e.g., rows, columns) that are related or linked to one another, using, e.g., spreadsheet or database technology.

For example, a First User 2102*a* (e.g., User 1, which may be identified by a unique identifier, etc.) may be linked to User Account Information 2104*a* (e.g., name, address, phone number, email address, preferences, etc.), User Login Information 2106a (e.g., login name, password, etc.), User Biometric Data 2108a (e.g., fingerprint, retina, iris, facial, voice, EKG, etc.), User Payment Information 2112a (e.g., credit card, debit card, bank account, host account, preferences on which account to use (e.g., default account), etc.), and User Authorized Location Information 2112a (e.g., at least one user location (e.g., X, Y, and/or Z coordinates (e.g., GPS coordinates, such as latitude, longitude and/or altitude), address, city, state, zip code, etc.) (e.g., the user's home, etc.), proximity data (e.g., within the user location, within a one mile radius from the user location, etc.). Similar data can be stored on other users (e.g., User n, 2102b).

As discussed above, the User Authorized Location Information 2112a may be used in conjunction with location information provided by the mobile application to determine whether the user (including the mobile device) is at an authorized location. For example, if the User Authorized Location Information 2112a includes the user's home address and a proximity radius of a one mile, then the user may be determined to be at an authorized location (e.g., for remote transactions) if the user (or the user's mobile device) is within a one-mile radius of the user's home address, or GPS coordinates associated therewith, when a transaction is being carried out. By way of another example, if the User Authorized Location Information 2112a includes the user's home zip code and a proximity value of "within the user location," then the user may be determined to be at an authorized location if the user (or the user's mobile device) is within the user's zip code, or GPS coordinates associated therewith, when a transaction is being carried out. Other information may be linked to each user. See, e.g., FIGS. 28 and 29 (discussed in greater detail below).

Similar information can also be stored on a particular merchant. For example, a First Merchant 2102c (Merchant 1, which may be identified by a unique identifier, etc.) may be linked to Merchant Account Information 2104c (e.g., name, address, phone number, website, email address, goods/services offered for sale, pending orders, etc.), at least one Merchant Time Window 2106c (e.g., hours of operation, etc.), a Merchant Remote Access Policy 2108c (e.g., whether goods/services can be purchase remotely, e.g., from the user's home, etc.), Merchant Location Information 2110c (e.g., at least a first merchant location (e.g., X, Y, and/or Z coordinates (e.g., GPS coordinates, such as latitude, longitude and/or altitude), address, city, state, zip code, etc.), proximity data (e.g., within the first merchant location, within one hundred feet from the first merchant location, etc.), etc.), and Merchant Authorized Location Information 2112c (e.g., at least a second merchant location (e.g., X, Y, and/or Z coordinates (e.g., GPS coordinates, such as latitude, longitude and/or altitude), address, city, state, zip code, etc.), proximity data (e.g., within two feet from the second user location, etc.), etc.). Similar data can be stored on other merchants (e.g., Merchant n, 2102d).

As discussed above, the Merchant Location 2110c may be used along with location information provided by the mobile application to identify Merchant 1. For example, if the Merchant Location 2110c includes an address of a store operated by Merchant 1 and a proximity radius of one hundred feet, and the user (or the user's mobile device) is at a location within a one hundred foot radius of the store's address (e.g., the location information provided to or by the mobile application is within a one hundred foot radius of the store's address), then Merchant 1 will be identified by the host device, and information on Merchant 1 (e.g., Merchant Account Information 2104c, etc.) will be provided to the mobile application and displayed to the user. This same information can also be used to authenticate the user or transaction. In other words, if the user (or the user's mobile device) is within a one-hundred-foot radius of the store's address, then the user (or the user's mobile device) may be considered to be at an authorized location. In other embodiments, other information can be used to authenticate the user or transaction. For example, if the Merchant Authorized Location Information 2112c includes a proximity radius of ten feet (e.g., identifying (roughly) the perimeter of the store, etc.), then the user will only be considered to be at an authorized location if the user is within a ten-foot radius of the store's address, or associated GPS coordinates. It should be appreciated that while proximity has been exemplified using a radius, the present invention is not so limited, and any method of identifying a particular area (e.g., using plural GPS coordinates, an X proximity value, a Y proximity value, etc.) is within the spirit and scope of the present invention.

The map 2100 may also store information on individual transactions. For example, a First Transaction 2102e (Transaction 1, which may be identified by a unique identifier, etc.) may be linked to a Merchant 2104e (e.g., a particular merchant, such a Merchant 1, a particular user, such as User n, etc.), a User 2106e (e.g., a particular user, such as User 1, etc.), a Transaction Date 2108e (e.g., a date of the transaction, etc.), a Description 2110e (e.g., a description of the transactions, such as goods/services, etc.), and Payment Information 2112e (e.g., cost of the transaction, a payment method used to pay for the transaction, etc.). Similar data can be stored on other transactions (e.g., Transaction n, 2102f).

It should be appreciated that the present invention is not limited to the map depicted in FIG. 21. A database having additional, fewer, or different fields is within the spirit and scope of the present invention. For example, payment information could be stored by the merchant, and not processed (or stored) by the host device. By way of another example, the transaction records may further include at least one image of the transaction. Such an image could be provided by the merchant (e.g., using security cameras operated by the merchant) or the user (e.g., using a camera on the mobile device) and linked together with the transaction, making it available upon request.

Figure 22:
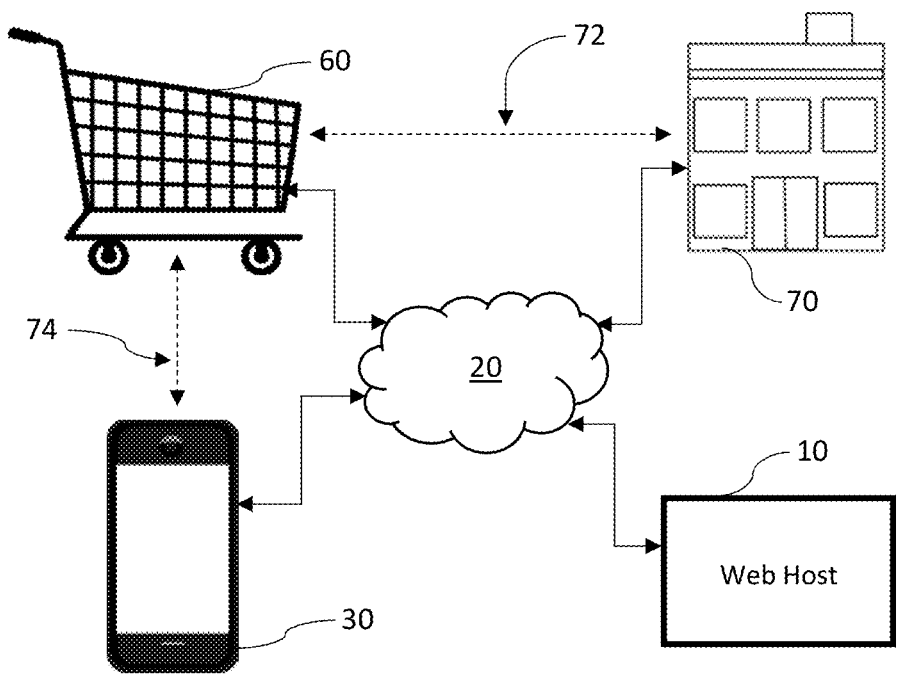
FIG. 22 depicts yet another way of providing information to a user of a mobile device, such as a smartphone or a smartwatch, while the user is shopping at a brick-and-mortar business.

The present invention can also be used to enhance a user's shopping experience when a user is shopping at a brick-and-mortar store. For example, as shown in FIG. 22, a mobile device operated by a first party may be in communication with a host device 10 and a merchant device 70 operated by a second party via a wide area network (WAN), such as the Internet 20. In this embodiment, as previously discussed, the host device 10 may also be in communication with at least one third-party device (not shown) via the network 20, such as a financial institution. See, e.g., FIG. 3. What distinguishes this embodiment from the embodiment depicted in FIG. 3, is that the host device 10 in further in communication with a shopping cart 60 via the network 20, which may or may not be operated by the second party.

It should be appreciated that in alternate embodiments, the mobile device 30 may also (or alternatively) be in communication with the shopping cart 60 either directly (e.g., via 74, such as Bluetooth, RF, WiFi, etc.) or indirectly (e.g., via network 20, via host device 10, etc.), and the merchant device 70 may be in communication with the shopping cart 60 either directly (e.g., via 72, such as Bluetooth, RF, WiFi, etc.) or indirectly (e.g., via network 20, via host device 10, etc.). Similarly, the mobile device 30 may be also (or alternatively) be in communication with the merchant device 70 directly and/or indirectly. Thus, for example, a mobile device 30 that communicates with the host device 10 via the network 10, where the host device 10 communicates with the merchant device 70 and the shopping cart 60 via the network 20, is within the spirit and scope of the present invention. Similarly, a mobile device 30 that communicates with the shopping cart 60 either directly (e.g., via Bluetooth, RF, WiFi, etc.) or through the merchant device 70 (e.g., where the mobile device 30 communicates with the merchant device 70 via the network 20 and the merchant device 30 communicates with the shopping cart 60 directly (e.g., via Bluetooth, RF, WiFi, etc.)) is also within the spirit and scope of the present invention.

Figure 23:
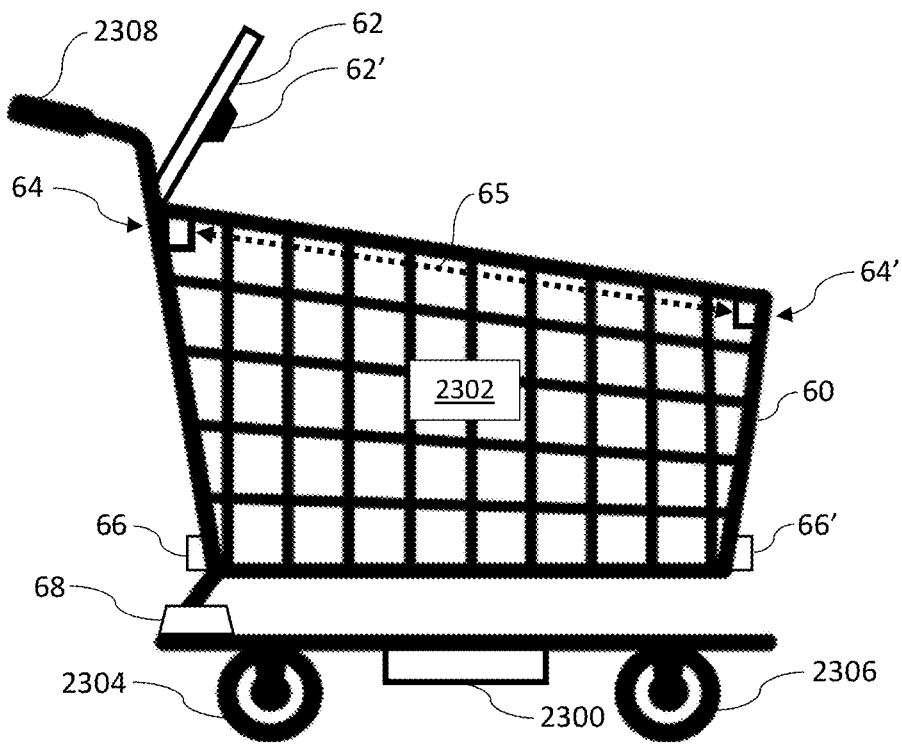
FIG. 23 provides a first example of a shopping cart that may be used in the embodiment depicted in FIG. 22.

FIG. 23 shows an example of a shopping cart in accordance with one embodiment of the present invention. In this embodiment, the shopping cart 60 is configured for movement on a substantially flat surface. As with most carts, it includes a basket 2302, a plurality of wheels 2304, 2306, and at least one handle 2308. However, the cart 60 also includes intelligence. For example, it may include an on-board computer 2300 (e.g., for receiving, transmitting, and processing information) and a display 62 (e.g., for displaying information to the first party). In alternate embodiments, it may also include components for determining items that have been placed in the cart 60. Preferably, a detector 62' is used to identify items that have been (or are being) placed within the cart 60. For example, the detector 62' may be a barcode scanner configured to scan barcodes on outer surfaces of items, an RFID interrogator configured to interrogate RFID tags on (or within) items, or a camera configured to capture visuals of items, where item-recognition software is used to identify items that are being imaged.

Other technology can be used to confirm that an item has indeed been placed within the cart. For example, a scale 68 may be positioned between the basket 2302 and the wheels 2304, 2306. Weight (or change therein) can be used to verify that an item has been placed inside the cart 60 (e.g., an increase by 6 ounces may confirm that a 6 ounce can of tomato paste has been placed inside the cart 60, etc.). By way of another example, an infrared (IR) light generator 64 (e.g., IR LED, etc.) and an IR light detector 64' (e.g., photocell, etc.) may be used to detect when items have been placed inside (or taken out of) the cart 60. By transmitting at least one IR beam over an upper surface 65 of the cart 60, a break (or discontinuity) in the beam may confirm that an item has been added to (or removed from) the cart 60.

It should be appreciated that the present invention is not limited to any particular way of determining whether an item has been placed inside the shopping cart, and all ways generally known to those skilled in the art are within the spirit and scope of the present invention. For example, cameras positioned around the store may be used (together with item-recognition software) to identify individual items that are being placed inside the cart. By way of another example, barcode technology (e.g., together with weight, etc.) can be used to identify individual items that are being placed inside the cart (e.g., similar to current self-checkout stations, etc.).

Figure 24:
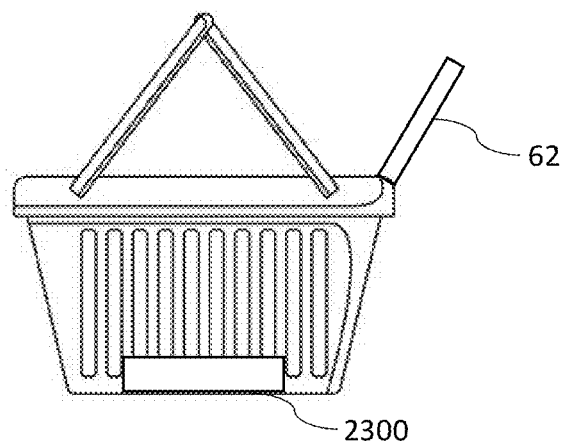
FIG. 24 provides a second example of a shopping cart that may be used in the embodiment depicted in FIG. 22.

It should also be appreciated that the present invention is not limited to the type, number, and location of components (electrical or otherwise) included on the cart. For example, the shopping cart may include at least one connector 66, 66' for transmitting power and information to/from the cart when the cart is docked. By placing connectors in both the front and the rear, carts can be nested, at traditional done, creating a continuity for power and information (i.e., a first cart's front connector is connected to a docking station, a second cart's front connector is connected to the first cart's rear connector, etc.). This would allow each cart (or a battery thereon) to be charged and to receive and/or transmit information to the merchant device (e.g., updating software to the cart (e.g., available items, prices, locations, etc.), downloading data (e.g., purchases made via the cart, customers using the cart, etc.), etc. By way of another example, the cart itself may be a small, hand-held basket (see FIG. 24) as opposed to a wheelable shopping cart.

Figure 25:
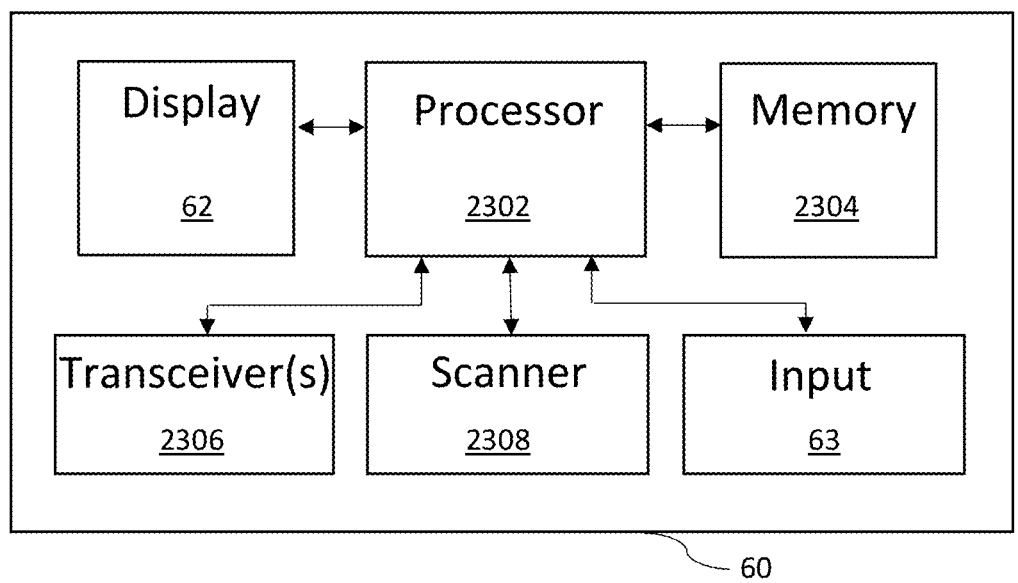
FIG. 25 depicts one embodiment of components that may be included in the shopping carts shown in FIGS. 23 and 24.

In one embodiment of the present invention, as shown in FIG. 25, the cart (regardless of its configuration) includes a processor 2302, a memory 2304, at least one transceiver 2306 (e.g., Bluetooth, RF, WiFi, etc.), a display 62, and an input device 63 (e.g., keyboard, touchscreen, etc.), wherein the transceiver(s) 2306 allows the cart to communicate with the mobile device 30, the merchant device 70, and/or the host device 10, the memory 2304 stores data, e.g., code for the processor 2302, items available for purchase (e.g., names, prices, location, etc.), items placed into the cart (e.g., names, prices, running total, running weight, etc.), customer data (e.g., customer name, etc.), etc., and the display 62 and input device 63 are used, respectively, to provide information to and receive information from the first party. The cart may also include a scanner 2308 (or the like) for identifying items that have been (or are being) placed into the cart. As stated above, FIG. 25 is merely exemplary, and a cart having fewer, additional, or different components (e.g., an optical recognition device (e.g., camera) instead of a scanner, multiple memory devices, etc.) is within the spirit and scope of the present invention.

Figure 26A:
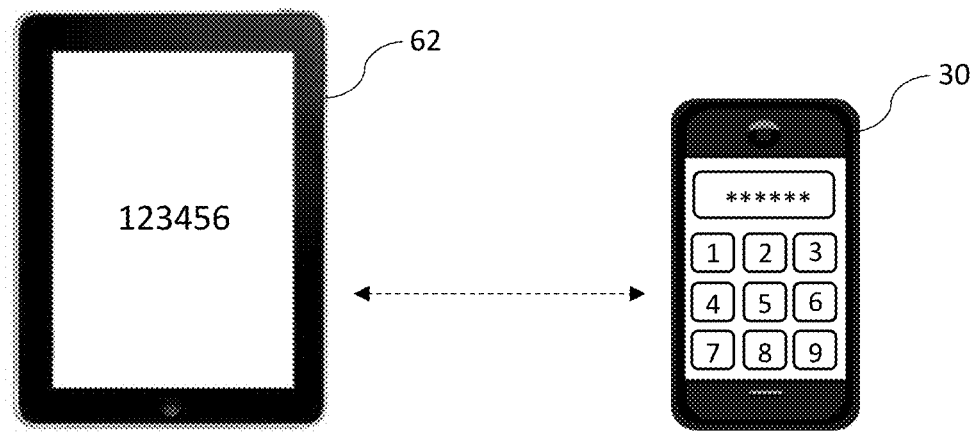
FIGS. 26a-j depict exemplary screen shots of a shopping cart application and/or a mobile application being used to facilitate a transaction in accordance with the embodiment depicted in FIG. 22.

Preferably, each cart has its own unique identifier (ID), allowing the system to identify one cart from a plurality of carts, i.e., identifying the cart that is being used by the first party. As shown in FIG. 26a, the user may enter the cart's ID into the mobile device (e.g., via the device's keypad, etc.), where the cart's ID is presented on the display 62 and/or a sticker on the cart 60. The ID can then be provided to the host device (not shown), allowing the cart to be linked (or synced) to the shopping session. This information may also (or alternatively) be provided to the merchant device (not shown) if the merchant device is responsible for communications with the cart.

It should be appreciated that the present invention is not limited to entering (manually) the cart's ID into the mobile device, and other ways of identifying the cart are within the spirit and scope of the present invention. For example, the application operating on the mobile device may capture the cart's ID (e.g., via the mobile device's camera feature), which may be displayed in human-readable form (e.g., 123456), or machine-readable form (e.g., a barcode). By way of another example, the cart may communicate (e.g., broadcast) its ID to the mobile device (e.g., using Bluetooth, NFC, etc.).

Once a shopping session is established, and the devices (mobile device, merchant device, host device, shopping cart) are linked, the first party can use the mobile device and/or the shopping cart (or the display and/or input device portions thereof) to enhance their shopping experience. It should be appreciated that the first party may interact with either the mobile device (or the screen portion thereof) (herein the first display) or the shopping cart (or the screen portion thereof) (herein the second display) to acquire additional information, depending on how the system is configured. For example, the first party may choose to interact with the first display (so as to not touch the second (public) display), or the first party may choose to interact with the second display, which is more conveniently location (e.g., the mobile device may be in the first party's pocket, purse, etc.). It should be appreciated that while the user may interact with either display, the second display is preferably used to present information to the user, as it may be larger and more conveniently located.

Figure 26B:
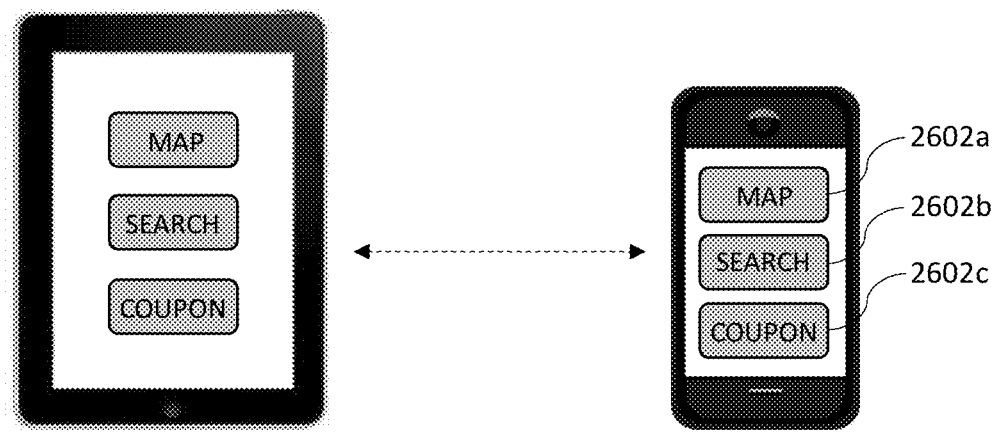
Figure 26C:
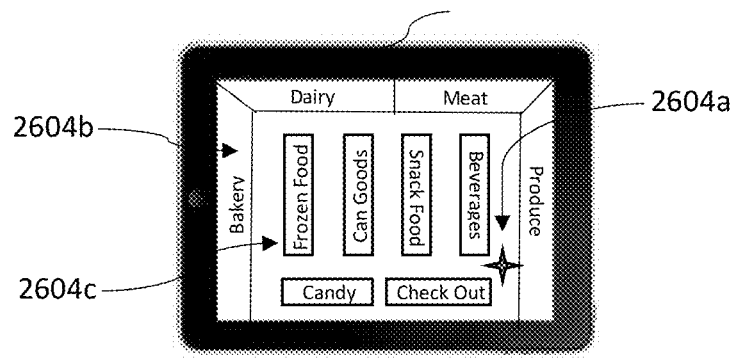

As shown in FIG. 26b, the first party may be presented with a plurality of options, including a map button 2602a, a search button 2602b, and a coupon button 2602c. Other buttons or interactable icons are within the spirit and scope of the present invention. If the map button 2602a is selected, a map of the store may be presented on the second display 26. See FIG. 26c. The map may include a location for the first party 2604a and locations for items (or categories of items) available for purchase (e.g., bakery 2604b, frozen food 2604c, etc.). To do this, the cart must have access to map data (e.g., stored in its memory, provided in real-time by the merchant device, etc.) and user-location data. The latter may be determined by determining the location of the mobile device or the location of the shopping cart. Previously discussed location methods may be used (e.g., WiFi-based positioning system, etc.) to determine locations of the mobile device and the shopping cart. However, because the store has a known footprint, other location techniques are available for the cart that are not available for the mobile device.

For example, the cart may be configured to read location information transmitted (or scannable) at various locations throughout the store. By way of example, at least one bakery identifier may be (a) posted for scanning (e.g., barcodes, etc.) or (b) transmitted (e.g., via IR, etc.), allowing the cart to locate itself as it is moved throughout the bakery portion of the store. In other words, the cart may understand that location 001 (read from a first barcode, transmitted from a first IR transmitter, etc.) is in the bakery, in front of the bagels, location 002 (read from a second barcode, transmitted from a second IR transmitter, etc.) is in the bakery, in front of the donuts, etc. By positioning a plurality of barcodes or IR transmitters throughout the store, the cart (using at least one barcode scanner or IR receiver) can autonomously determine its location as it is move throughout the store.

Figure 26D:
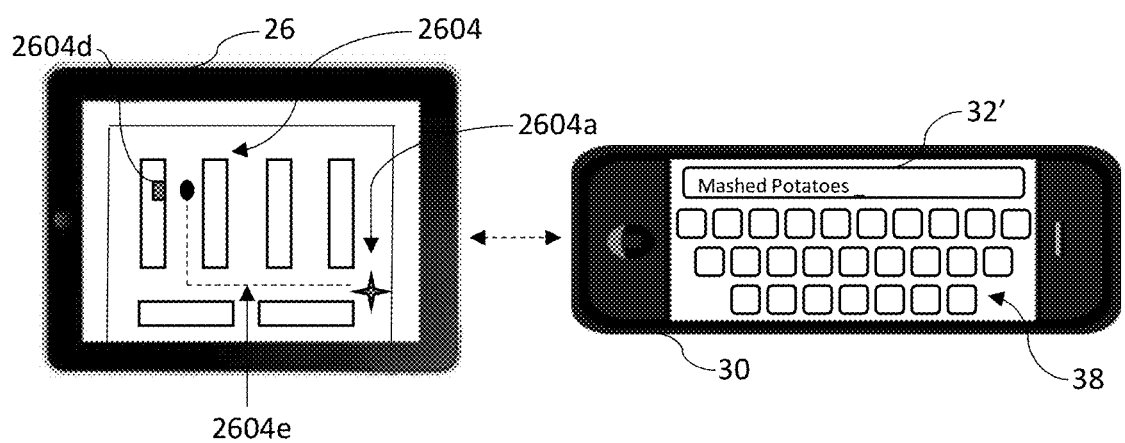

With reference back to FIG. 26b, if the search button 2602b is selected, the first party may be presented with a field 32' for entering a search query (e.g., "mashed potatoes") via a keyboard 38. See FIG. 26d. A map of the store 2604 may then be presented on the second display 26, which may include a location of the first party 2604a, a location of the search query 2604d ("mashed potatoes"), and a route 2604e (e.g., directions, etc.) therebetween. The route 2604e may be provided visually and/or audibly, providing step-by-step directions from the location of the first party 2604a to the location of the search query 2604d (e.g., take a left at the Check Out, take a right after the Can Goods isle, proceed straight for 100 feet, the Mashed Potatoes are located on the left hand side, top shelf, 10 feet before the end of the isle, next to the Ketchup).

To provide more accuracy, a store could be laid out in a grid fashion (e.g., longitude, latitude, altitude), where items are locatable by X, Y, and/or Z coordinates. This would allow the system to provide more accurate directions. For example, Mashed Potatoes may be located at 10/15/3, or on isle 10, 15 feet from the front of the isle, and three feet off the ground. Markings in the store may allow the customer to more accurately locate an item (e.g., by labeling each isle (side-to-side), distances down an isle (front-to-back), and vertical distances (floor-to-ceiling). It should be appreciated that labels other than numerical (e.g., alphabetical, colors, shapes, etc.) may also (or alternatively) be used to locate an item (e.g., Mashed Potatoes may be located at 10-Red-A, or isle 10, section "Red," compartment A).

Figure 26E:
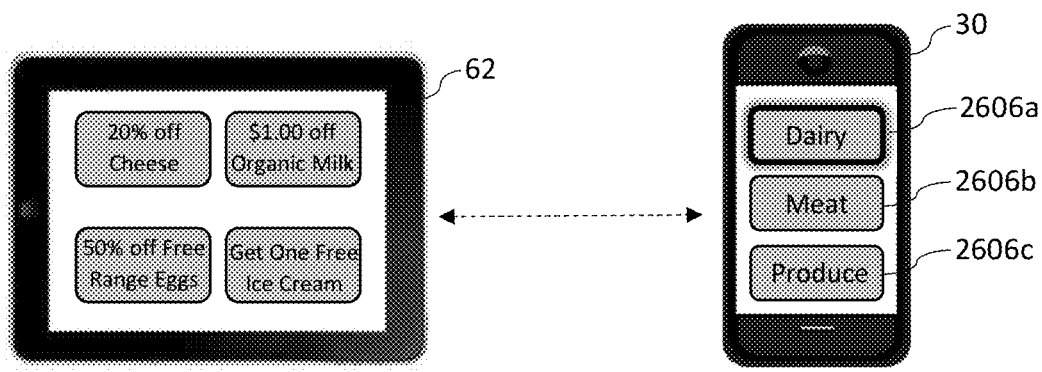

The present invention can also be used to provide coupons to the first party. For example, as shown in FIG. 26e, a dairy button 2606a could be used to receive dairy-related coupons, a meat button 2606b could be used to receive meat-related coupons, a produce button 2606c could be used to receive produce-related coupons, etc. For example, if the dairy button 2606a is selected, coupons for cheese, milk, eggs, and ice cream may be presented on the second display 62. By presenting coupons in this fashion, the coupons can be general coupons, available to all, or personalized coupons, specific to the first party (e.g., based on prior purchases, the first party's shopping list, etc.). In alternate embodiments, the location of the first party (or the shopping cart) may also (or alternatively) be used to identify coupons to be presented to the first party (e.g., coupons for wine may be presented to the first party when they are in the alcohol aisle, etc.).

In order to enhance a first party's shopping experience, the host and/or merchant device may store information on prior purchases. For example, as shown in FIG. 28, information may be stored that links individual users to recent purchases and coupons selected based on those purchases. For example, if User 1 2802a recently purchased Lucerne ice cream 2804a, then a coupon for Ben & Jerry's ice cream 2806a may be presented to the user upon a subsequent visit (e.g., in response to selecting the dairy button 2606a, in response to being in the frozen food aisle, in response to entering the store, etc.).

As shown in FIG. 29, the first party may also upload (or enter) their shopping list to (or with) the host device, e.g., via the mobile application. This may include the item 2902a (mayonnaise), brand 2904a (Best Foods), type 2906a (light), size 2908a (64 oz), quantity 2910a (2), price 2912a (e.g., provided by the first party or the host device and based on previous purchases, best price available, price at a particular store, desired price, etc.), and comments related thereto 2914a (e.g., completely out, running low, etc.). This information (e.g., recent purchases, shopping list, etc.) can then be used to enhance the first party's shopping experience.

Figure 26F:
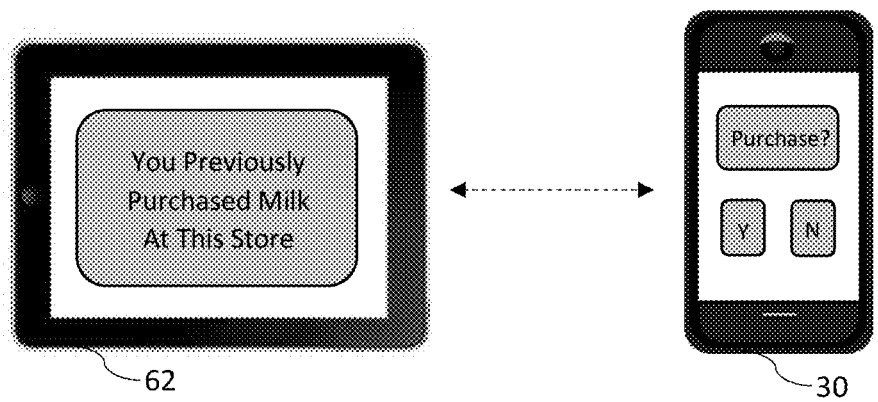
Figure 26G:
Figure 26H:

For example, as shown in FIG. 26f, the second display 62 may notify the first party of an item previously purchased, and the mobile device 30 may be used to indicate whether the item should be purchased again. If yes, a map may be presented on the second display 62, showing a location for the item. If no, other information concerning the item may be presented on the second display 26. For example, the second display 62 may notify the first party that the item is currently on sale (see FIG. 26g) and/or the item is on the first party's shopping list (see FIG. 26h). It should be appreciated that the screen shots provided herein are merely exemplary, and that other screen shot are within the spirit and scope of the present invention. For example, if the user is shopping for items off their shopping list (see FIG. 29), the second display 26 may guide the user through the store in an orderly fashion to acquire the items. This may be done automatically by comparing items on the list to locations of those items in the store and routing the user through the store to minimize travel distance, perhaps taking into consideration other factors (e.g., starting location, parking location, congestion, special care items (e.g., expensive, hot, cold, heavy, etc.), which may be acquired last, etc.).

Figure 26I:
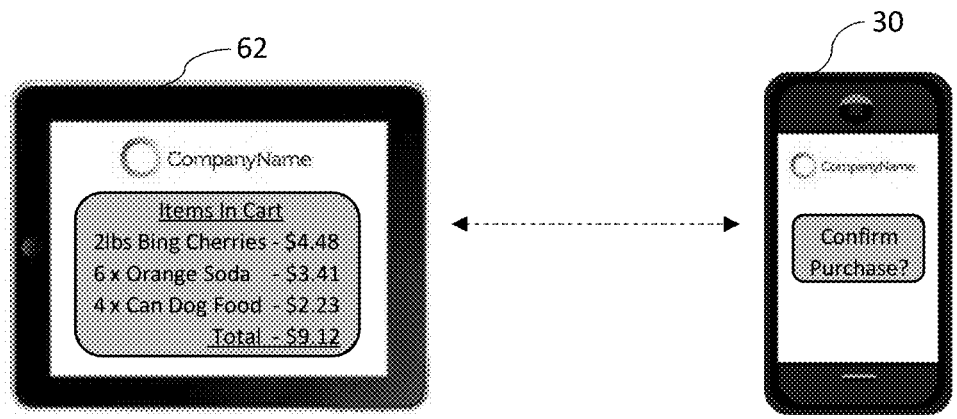
Figure 26J:
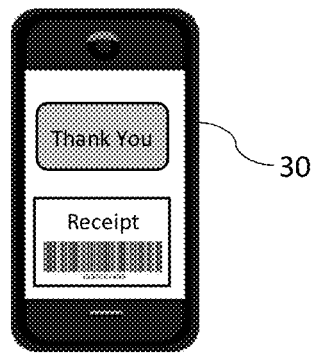

As shown in FIG. 26i, once the user is done shopping (or during the shopping session), the second display 62 may be used to show items that have been placed into the shopping cart and amounts due for the same (individually and/or cumulatively). The first party can then use the mobile device 30 to confirm that these items are to be purchased. Once the transaction is complete (details of which are discussed above), the mobile device 30 may provide the user with a receipt, which may include a time stamp (i.e., time of purchase) and be used by the first and/or second parties to confirm that the items have indeed been purchased.

The system may determine that the first party is done shopping by monitoring the first party's location (e.g., whether the first party is in a check-out location, near the store exit, whether the first party has exited the store, etc.). The first party may also interact with the mobile device to indicate that they are done shopping and would like to complete the transaction, or "check out."

Figure 27A:
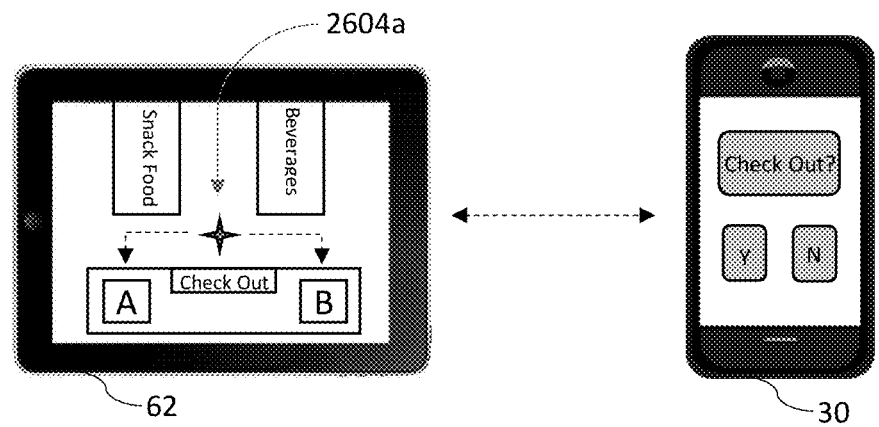
FIG. 27a depicts exemplary screen shots of a shopping cart application and a mobile application being used to facilitate a transaction in accordance with an alternate embodiment of the present invention.

In order to further protect the first and/or second parties, the user may be guided to a specific location (e.g., within the store, etc.) to complete their transaction, or "check out." For example, as shown in FIG. 27*a*, if the first party indicates that they would like to check out (e.g., by selecting "Y" on device 30), the second device 62 may guide the user to a specific "check out" location (e.g., A, B, etc.). This protects the first party by requiring the first party, the first device, and the shopping cart (with the second device and the goods being purchased) to be at a specific location at a specific time, which can be captured via cameras (e.g., on the cart, in the store, etc.) if desired.

Figure 27B:
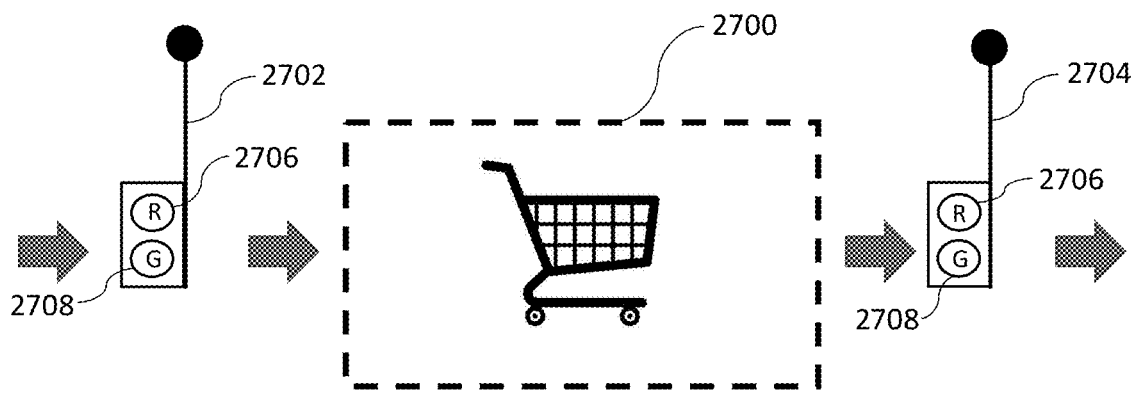
FIG. 27b provides examples of how indicators can be used to guide the first party through a transaction or "check out" process and notify the second party of whether the transaction has or has not been completed.

This also protects the second party by providing them with assurance that the transaction has been completed (i.e., that the first party has paid for the goods). For example, as shown in FIG. 27*b*, the first party may be directed to location 2700. When the first party approaches the location, mechanical 2702 (e.g., door, arm, etc.), visual 2706, 2708 (red light, green light, etc.), and/or audible (not shown) indicators may be used to inform the first party of a time when they are to position themselves, the first device, and/or the shopping cart at location 2700. Once the transaction has been completed (see, e.g., FIGS. 26*i* and *j*), similar mechanical 2704, visual 2706, 2708, and/or audible (not shown) indicators may be used to inform the first and/or second parties of this completion (i.e., confirming payment for the goods).

It should be appreciated that other indicators are within the spirit and scope of present invention, and that different indicators may be used to provide information to the first and second parties. For example, at least one indicator may inform the first party that the transaction has been completed and that the first party is free to leave the store, whereas at least one other indicator may inform the second party whether the transaction was completed. The latter may be accomplished, for example, by presenting transaction information (e.g., accepted, denied, etc.) to a store employee via a third display. This would allow a single store employee to monitor several check out locations, confirming that goods have been paid for before individuals leave the store.

Having thus described several embodiments of a system and method for using at least location information to facilitate a transaction, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. A method for using at least location information to facilitate a transaction between a first party and a second party, said transaction involving said first party purchasing at least one item from said second party, comprising:
   receiving a request from said first party to opening an application on a mobile device, said application being in communication with a host device via a wide area network (WAN);
   receiving login information from said first party, said login information being used to identify an account for said first party, said account being linked to at least one payment method;
   determining a location of said mobile device, said location being provided to said host device via said WAN and used to identify said second party and to link said first party to one of a plurality of shopping carts at said second party;
   displaying first information to said first party via a first display device on said one of said plurality of shopping carts, said first information including at least an amount due for said at least one item at least after said at least one item has been placed in said one of said plurality of shopping carts, wherein data concerning said at least one item is provided to said host device after said at least one item has been placed in said one of said plurality of shopping carts;
   displaying second information to said first party via a second display device on said mobile device, said second information including at least said amount due for said at least one item, said second information being received from said host device via said WAN; and
   receiving by said application an acknowledgement that said first party would like to purchase said at least one item, said acknowledgement being provided to said host device via said WAN and resulting in said payment method being used purchase said at least one item from said second party.

2. The method of claim 1, wherein said step of receiving login information from said first party comprises receiving at least a user name, a password associated with said account, and at least one biometric of said first party.

3. The method of claim 2, wherein said at least one biometric of said first party comprises at least one of a fingerprint of said first party, and image of said first party, and audio from said first party.

4. The method of claim 1, further comprising steps of determining a second location of said mobile device and determining whether said second location of said mobile device corresponds with a check-out location within a structure operated by said second party; wherein correspondence results in said first party being able to use said application to purchase said at least one item from said second party.

5. The method of claim 1, further comprising said host device receiving a request from said application for said at least one item prior to said at least one item being placed in said one of said plurality of shopping carts; said request being provided to said at least one shopping cart, wherein said first display device is used to display a location of said at least one item within a store operated by said second party.

6. The method of claim 5, wherein said location of said at least one item within said store is displayed along with a location of said first party in said store.

7. The method of claim 6, wherein said location of said first party is determined by determining a location of said mobile device within said store, said location of said mobile device being provided to said one of said plurality of shopping carts by said host device.

8. The method of claim 6, wherein said location of said first party is determined by determining a location of said one of said plurality of shopping carts within said store.

9. The method of claim 1, wherein said first display device is used to display third information to said first party, said third information being personalized for said first party and based on data received from said host device, said data comprising at least one of an item previously purchased by said first party and an item on said first party's shopping list.

10. A system for using at least location information to facilitate a transaction between a first party and a second party, said transaction involving said first party purchasing at least one item from said second party, comprising:
a mobile device in communication with a host device via a wide area network (WAN) and comprising at least one memory device for storing an application adapted to perform the steps of:
receiving login information from said first party, said login information being used to identify an account for said first party, said account being linked to at least one payment method;
determining a location of said mobile device, said location being provided to said host device via said WAN and used to identify said second party and to link said first party to one of a plurality of shopping carts at said second party;
receiving data from said host device on said at least one item after said at least one item has been placed in a shopping cart operated by said first party in a store operated by said second party;
displaying information to said first party via a display device on said mobile device, said information including at least an amount due for said at least one item, said information being received from said host device via said WAN; and
receiving an acknowledgement that said first party would like to purchase said at least one item, said acknowledgement being provided to said host device via said WAN and resulting in said payment method being used to purchase said at least one item from said second party;
wherein said host device is configured to use information received from said application to link at least one of said first party, said application, and said mobile device to said shopping cart;
wherein said shopping cart is used to display data on at least one item including said amount due for said at least one item to said first party and to provide said data to said host device in response to said at least one item being placed in said shopping cart.

11. The system of claim 10, wherein said application is further adapted to determine a second location of said mobile device and to determine whether said second location corresponds with a check-out location within a structure operated by said second party, wherein correspondence results in said first party being able to use said application to purchase said at least one item from said second party.

12. The system of claim 10, further comprising at least one store device in communication with said host device via said WAN and said shopping cart via at least one wireless communication channel, said shopping cart communicating with said host device via said stored device.

13. The system of claim 10, wherein said application is further adapted to receive a request from said first party for said at least one item prior to said at least one item being placed in said shopping cart, wherein said request is provided to said shopping cart via said host device, said shopping cart being configured to display a location of said at least one item within a store operated by said second party.

14. The system of claim 13, wherein said shopping cart is further configured to display a location of said first party in said store.

15. The system of claim 14, wherein said location of said first party is determined by determining a location of said mobile device within said store, said location of said mobile device being provided to said shopping cart via said host device.

16. The system of claim 14, wherein said location of said first party is determined by determining a location of said shopping cart within said store.

17. The system of claim 16, wherein said shopping cart is configured to use location information to determine its location within the store, where different location information is transmitted from different locations within the store.

18. The system of claim 16, wherein said shopping cart: is configured to use triangulation to determine its location within the store.

19. The system of claim 10, wherein said shopping cart is further used to display personalized information to said first party, said personalized information being based upon data received from said host device comprising at least one of an item previously purchased from said store and an item from said first party's shopping list.

20. A method for purchasing an item from a second party, comprising:
receiving login information for an application operating on a mobile device, said login information being used to identify an account linked to at least one payment method:
determining a location of said mobile device, said location being provided to said host device via said wide area network (WAN) and used to identify a store operated by said second party and to link said first party to one of a plurality of shopping carts at said second party;
displaying first information on said shopping cart, said first information including at least an amount due for said item at least after said item has been placed in said shopping cart, wherein data concerning said at least one item is provided to said host device from said shopping cart via a store device, said shopping cart communicating with said store device via a wireless communication channel and said store device communicating with said host device via said WAN;
displaying second information on said mobile device, said second information including at least said amount due for said item, said second information being received from said host device via said WAN; and
receiving by said application an acknowledgement to purchase said item form said second party, said acknowledgement resulting in said payment method being used purchase said item.

* * * * *